United States Patent
Chaar et al.

(10) Patent No.: US 10,368,113 B2
(45) Date of Patent: *Jul. 30, 2019

(54) ADVERTISEMENT SCHEDULER

(71) Applicant: Turner Broadcasting System, Inc., Atlanta, GA (US)

(72) Inventors: Wassim Samir Chaar, Coppell, TX (US); David James Benoit, Fayetteville, GA (US)

(73) Assignee: TURNER BROADCASTING SYSTEMS, INC., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/026,422

(22) Filed: Jul. 3, 2018

(65) Prior Publication Data

US 2018/0316957 A1    Nov. 1, 2018

Related U.S. Application Data

(63) Continuation of application No. 14/842,799, filed on Sep. 1, 2015, now Pat. No. 10,028,003, which is a (Continued)

(51) Int. Cl.
*H04N 21/81* (2011.01)
*H04N 21/234* (2011.01)
(Continued)

(52) U.S. Cl.
CPC . *H04N 21/26208* (2013.01); *H04N 21/23424* (2013.01); *H04N 21/2547* (2013.01);
(Continued)

(58) Field of Classification Search
CPC ......... H04N 21/26208; H04N 21/2547; H04N 21/8455; H04N 21/23424; H04N 21/26241; H04N 21/25883; H04N 21/812
See application file for complete search history.

(56) References Cited

U.S. PATENT DOCUMENTS 6,947,450 B2    9/2005  Mangin
8,401,897 B1 *  3/2013  Chatterjee .......... G06Q 30/0261
                                                  705/14.1
(Continued)

FOREIGN PATENT DOCUMENTS

| WO | 0051335 A2   | 8/2000 |
| WO | 2000051335 A3 | 1/2001 |
| WO | 2001007985 A2 | 2/2001 |

OTHER PUBLICATIONS

Araman, V., Popescu, I., 2010. Media revenue management with audience uncertainty: Balancing upfront and ,pot market sales. Manufacturing & Service Operations Management 2 (12), 190-212.
(Continued)

*Primary Examiner* — Benjamin R Bruckart
*Assistant Examiner* — Aklil M Tesfaye
(74) *Attorney, Agent, or Firm* — Chip Law Group

(57) ABSTRACT

An advertisement scheduler receives a commercial break schedule generated from a completed assignment of one or more spots that correspond to the deals comprising advertiser's orders to place the spots into one or more commercial breaks in the commercial break schedule based on constraints and placement requirements. The advertisement scheduler may determine representative liability per pending spot for the deals and reshuffle the placement of the spots based on the representative liability of the deals in order to minimize liability associated with the deals. The advertisement scheduler may reshuffle the placement of the spots for maximum delivery of candidate deals, where the reshuffle is based on a forecast of expected viewership associated with the deals, and a pacing computation of cumulative demographics guaranteed at a particular point in time, modify the forecast based on weighting factor, and generate a finalized commercial break schedule based on the reshuffling.

30 Claims, 14 Drawing Sheets

Related U.S. Application Data continuation-in-part of application No. 14/705,642, filed on May 6, 2015, now Pat. No. 9,344,750, which is a continuation of application No. 13/271,718, filed on Oct. 12, 2011, now Pat. No. 9,055,308.

(51) Int. Cl.

| | | |
|---|---|---|
| *H04N 21/258* | (2011.01) | |
| *H04N 21/262* | (2011.01) | |
| *H04N 21/845* | (2011.01) | |
| *H04N 21/2547* | (2011.01) | |

(52) U.S. Cl.
CPC . *H04N 21/25883* (2013.01); *H04N 21/26241* (2013.01); *H04N 21/812* (2013.01); *H04N 21/8455* (2013.01)

(56) References Cited

U.S. PATENT DOCUMENTS

| | | | |
|---|---|---|---|
| 8,516,515 B2 | 8/2013 | Zigmond et al. | |
| 8,544,036 B2 | 9/2013 | Bollapragada et al. | |
| 8,973,023 B1 | 3/2015 | Rao et al. | |
| 9,147,198 B2 | 9/2015 | Emans et al. | |
| 2003/0188308 A1 | 10/2003 | Kizuka | |
| 2005/0171897 A1 | 8/2005 | Forsythe et al. | |
| 2006/0259455 A1 | 11/2006 | Anderson et al. | |
| 2007/0033623 A1 | 2/2007 | Fredrickson et al. | |
| 2007/0156525 A1 | 7/2007 | Grouf et al. | |
| 2007/0204310 A1 | 8/2007 | Hua et al. | |
| 2007/0288979 A1 | 12/2007 | Yen | |
| 2008/0189178 A1 | 8/2008 | Schepers et al. | |
| 2008/0189734 A1 | 8/2008 | Schepers et al. | |
| 2008/0201188 A1* | 8/2008 | Heyman | G06Q 30/02 705/14.41 |
| 2008/0250447 A1* | 10/2008 | Rowe | G06Q 30/02 725/32 |
| 2008/0263578 A1 | 10/2008 | Bayer et al. | |
| 2008/0263583 A1 | 10/2008 | Heath | |
| 2009/0006145 A1 | 1/2009 | Duggal et al. | |
| 2009/0070211 A1 | 3/2009 | Gonen | |
| 2009/0106082 A1 | 4/2009 | Senti et al. | |
| 2009/0144168 A1 | 6/2009 | Grouf et al. | |
| 2009/0150224 A1 | 6/2009 | Lu et al. | |
| 2009/0254932 A1 | 10/2009 | Wang et al. | |
| 2009/0276317 A1 | 11/2009 | Dixon et al. | |
| 2010/0023408 A1* | 1/2010 | McNeill | G06Q 30/02 705/14.69 |
| 2010/0042496 A1 | 2/2010 | Wang et al. | |
| 2010/0088719 A1 | 4/2010 | Hawkins et al. | |
| 2010/0146542 A1* | 6/2010 | Weihs | H04N 7/17318 725/34 |
| 2011/0078740 A1 | 3/2011 | Bolyukh et al. | |
| 2011/0119136 A1 | 5/2011 | Eldreth et al. | |
| 2011/0161162 A1 | 6/2011 | Ketchum | |
| 2011/0288907 A1 | 11/2011 | Harvey et al. | |
| 2012/0042338 A1 | 2/2012 | Kitts et al. | |
| 2012/0167125 A1 | 6/2012 | Grubb | |
| 2013/0097629 A1 | 4/2013 | Popescu et al. | |
| 2013/0205339 A1 | 8/2013 | Haberman et al. | |
| 2013/0219427 A1 | 8/2013 | Zundel et al. | |
| 2013/0254787 A1 | 9/2013 | Cox et al. | |
| 2014/0006118 A1 | 1/2014 | Charania | |
| 2014/0046661 A1 | 2/2014 | Bruner | |
| 2014/0074591 A1 | 3/2014 | Allen et al. | |
| 2014/0082660 A1 | 3/2014 | Zhang et al. | |
| 2014/0109123 A1 | 4/2014 | Balakrishnan et al. | |
| 2014/0143032 A1 | 5/2014 | Tomlin et al. | |
| 2015/0089540 A1 | 3/2015 | Kitts et al. | |
| 2015/0186403 A1 | 7/2015 | Srivastava et al. | |
| 2015/0348091 A1 | 12/2015 | Haberman et al. | |
| 2015/0365735 A1 | 12/2015 | Kunisetty et al. | |
| 2015/0373387 A1 | 12/2015 | Chaar et al. | |
| 2016/0117718 A1 | 4/2016 | Hood et al. | |
| 2016/0357362 A1 | 12/2016 | Gauci et al. | |

OTHER PUBLICATIONS

Bertsimas, D., Tsitsiklis, J., 1997. Introduction to Linear Optimization. Athena Scientific, Belmont, Massachusetts.

Bollapragada, S., Bussieck, M., Mallik, S., 2004. Scheduling commercial videotapes in broadcast television. Operations Research 52 (5), 679-689.

Bollapragada, S., Cheng, H., Phillips, M., Scholes, M., Gibbs, T., Humphreville, M., 2002. Nbc's optimization systems Increase its revenues and productivity. Interfaces 32 (1), 47-60.

Bollapragada, S., Garbiras, M., 2004. Scheduling commercials on broadcast television. Operations Research 52 (3), 337-345.

Corrected Notice of Allowance in U.S. Appl. No. 14/930,586 dated Aug. 1, 2018.

Corrected Notice of Allowance in U.S. Appl. No. 14/930,586 dated Jul. 3, 2018.

Danaher, P., Dagger, T., 2012. Using a nested legit model to forecast television ratings. International Journal of Forecasting 28 (3), 607-622.

Danaher, P., Dagger, T., Smith, M., 2011. Forecasting television ratings. International Journal of Forecasting 27 (4), 1215-1240.

Final Office Action in U.S. Appl. No. 14/842,808 dated Sep. 10, 2018.

Horen, J., 1980. Scheduling of network television programs. Management Science 26 (4), 354-370.

International Search Report and the Written Opinion of the International Searching Authority, or the Declaration, in International application No. PCT/US12/59857, dated Jan. 4, 2013. (11 pages).

Non-Final Office Action in U.S. Appl. No. 14/930,599 dated Aug. 28, 2018.

Non-Final Office Action in U.S. Appl. No. 15/091,475 dated Sep. 28, 2018.

Non-Final Office Action in U.S. Appl. No. 15/865,716 dated Jul. 23, 2018.

Notice of Allowance in U.S. Appl. No. 14/842,799 dated Apr. 17, 2018.

Notice of Allowance in U.S. Appl. No. 14/842,799 dated Jun. 15, 2018.

Notice of Allowance in U.S. Appl. No. 14/842,799 dated May 10, 2018.

Notice of Allowance in U.S. Appl. No. 14/930,586 dated May 18, 2018.

Notice of Allowance in U.S. Appl. No. 14/930,586 dated May 2, 2018.

Notice of Allowance in U.S. Appl. No. 14/930,586 dated May 24, 2018.

Office Action in U.S. Appl. No. 14/842,808 dated Mar. 21, 2018.

Reddy, S., Aronson, J., Stam, A., 1998. Spot: Scheduling programs optimaly for television. Management Science 44(1), 83-102.

Final Office Action in U.S. Appl. No. 14/930,559 dated Feb 25, 2019.

Final Office Action in U.S. Appl. No. 15/091,475 dated Mar. 28, 2019.

Final Office Action in U.S. Appl. No. 15/865,716 dated Mar 5, 2019.

Non-Final Office Action in U.S. Appl. No. 15/621,147 dated Jan 15, 2019.

Non-Final Office Action in U.S. Appl. No. 15/621,151 dated Jan 15, 2019.

Advisory Action for U.S. Appl. No. 14/930,559 dated May 6, 2019.

Non-Final Office Action for U.S. Appl. No. 14/842,808 dated May 31, 2019.

* cited by examiner

ADVERTISEMENT SCHEDULER

CROSS-REFERENCE TO RELATED APPLICATIONS/INCORPORATION BY REFERENCE

This application makes reference to, claims priority to, claims the benefit of, and is a continuation of, U.S. patent Ser. No. 10/028,003, which was filed on Sep. 1, 2015, which is a continuation-in-part of U.S. Pat. No. 9,344,750, which was filed on May 6, 2015, which is a continuation of U.S. Pat. No. 9,055,308, which was filed on Oct. 12, 2011.

This application makes reference to:
U.S. application Ser. No. 14/842,808, which was filed on Sep. 1, 2015; and
U.S. Pat. No. 9,922,341, which was filed on Sep. 1, 2015.

Each of the above referenced patent application and patent is hereby incorporated herein by reference in its entirety.

FIELD OF TECHNOLOGY

Certain embodiments of the disclosure relate to placement of commercial advertisement spots into commercial breaks. More specifically, certain embodiments of the disclosure relate to a method and system for scheduling commercial advertisements.

BACKGROUND

The process of scheduling linear media advertisement spots into commercial breaks tends to be tedious, prone to errors, and incomplete. While some systems are available to receive an advertiser's order for the placement of spots into commercial breaks, these products either simply try to fill empty holes that exist within already scheduled commercial breaks on a first come, first placed basis, or do not address all requirements associated with the commercials. As a result, the systems currently available typically fail to honor all the constraints and requirements for each of the spots.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for scheduling commercial advertisements, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for scheduling commercial advertisements. Various embodiments of the disclosure provide for a television advertisement scheduling system, for example, which may comprise a spot scheduler, and an advertisement scheduler. The advertisement management system may communicate with a plurality of advertiser order generation systems and electronically receives, via a communication network, deals comprising advertiser orders. The advertisement scheduler may receive a commercial break schedule generated from a completed assignment of one or more spots, wherein the one or more spots correspond to the deals comprising the advertiser orders to place the one or more spots into one or more commercial breaks in the commercial break schedule based on constraints and placement requirements. The advertisement scheduler may determine a current indexing representative of the liability per pending spot, for one or more of the deals, and reshuffle the placement of the one or more spots based on the current indexing representative of the liability per pending spot of the one or more deals in order to minimize liability associated with the one or more deals. The advertisement scheduler may reshuffle the placement of the one or more spots based on a forecast of expected viewership associated with the one or more deals, and generate a finalized commercial break schedule based on the reshuffling.

Figure 1A:
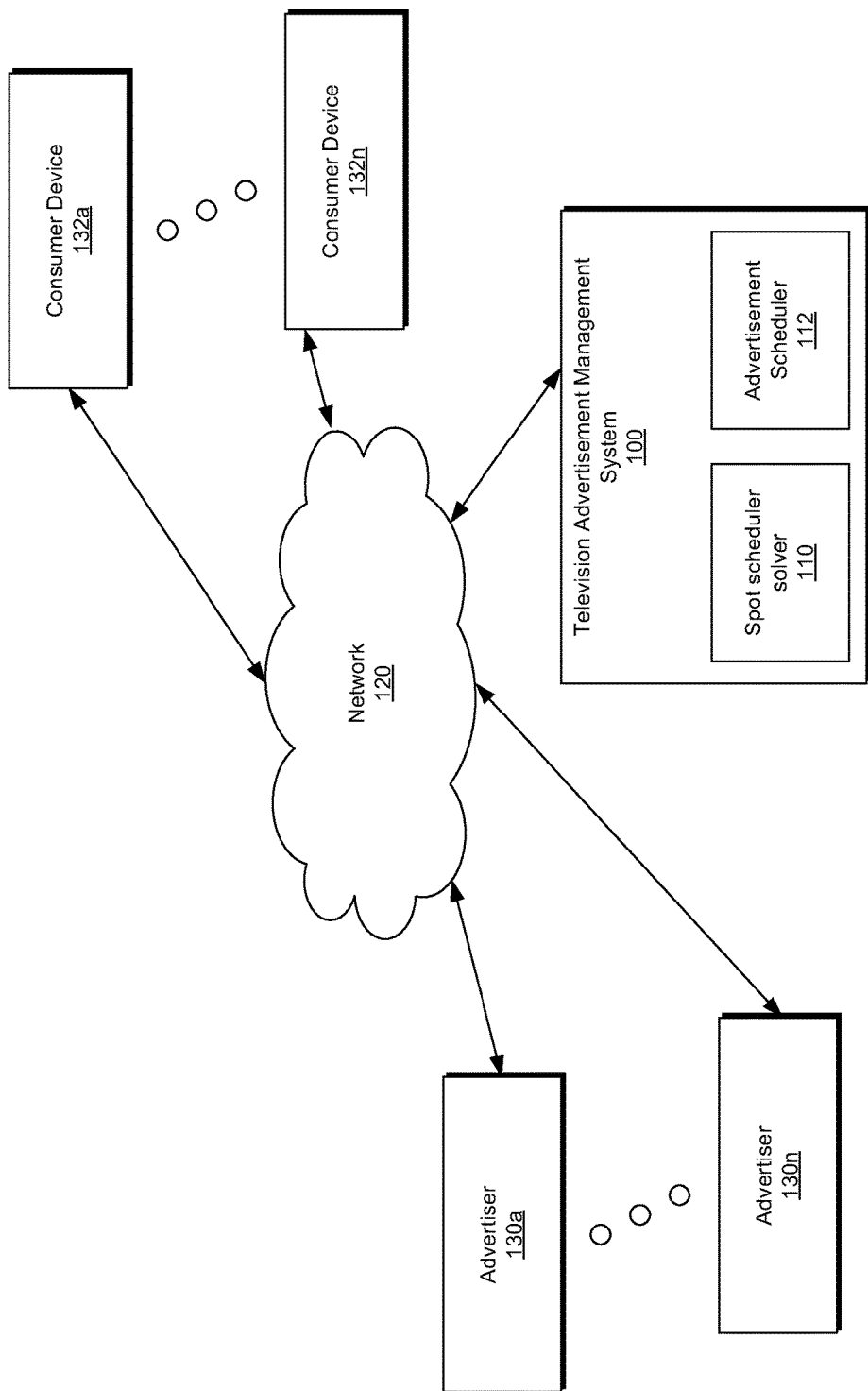
FIG. 1A is a block diagram that illustrates an exemplary system for receiving and processing spot scheduling orders, in accordance with an exemplary embodiment of the disclosure.

FIG. 1A is a block diagram that illustrates an exemplary system for receiving and processing spot scheduling orders, in accordance with an exemplary embodiment of the disclosure. Referring to FIG. 1A, there is shown a television advertisement scheduling system 100 that is communicatively coupled to advertiser order generation systems 130a, . . . , 130n through a network 120. Consumer devices 132a, . . . , 132n are communicatively coupled to the network 120. The television advertisement scheduling system 100 may comprise a spot scheduler solver 110, and an advertisement scheduler 112.

The network 120 may be any kind of network, or a combination of various networks, and it is shown illustrating the communication that may occur between the advertiser order generation systems 130a, . . . , 130n and the television advertisement scheduling system 100. For example, the network 120 may comprise one or more of a cable television network, the Internet, a satellite communication network, a wide area network (WAN), a medium area network (MAN), and a local area network (LAN).

The television advertisement scheduling system 100 may be operated by a broadcasting company and may comprise a spot scheduler solver 110. The broadcast company may be operable to multicast content via a plurality of channels, for example, traditional over-the-air broadcast channels, cable television networks, satellite communication networks, the Internet, and/or other content delivery networks. The spot scheduler solver 110 may comprise suitable logic, circuitry, code, and/or interfaces that may be operable to receive orders from one or more of the advertiser order generation systems 130a, . . . , 130n to place advertisements spots into one or more commercial breaks that occur during television programming broadcast. That is, the spot scheduler solver 110 may be utilized to determine the appropriate scheduling of advertisement spots to produce a commercial break schedule according to the information provided by the advertiser order generation systems 130a, . . . , 130n. The advertiser order generation systems 130a, . . . , 130n may place orders with the broadcasting company that include information about the type of spots to be broadcast, the number of spots to be broadcast, and when should the spots be aired. In this regard, the advertiser order generation systems 130a, . . . , 130n may electronically book spots to a selling title (ST), and within the selling title there are constraints. The advertiser order generation systems 130a, . . . , 130n may provide multiple orders, which need not be submitted at the same time. Therefore, the spot scheduler solver 110 may continuously receive orders with new or additional spots to be placed and may need to update any previously determined commercial break schedule to accommodate the constraints and requirements of those spots already placed and of the new spots being received.

The television advertisement scheduling system 100 may have a cutoff after which orders submitted by the advertiser order generation systems 130a, . . . , 130n may not be considered by the spot scheduler solver 110 when preparing a next commercial break schedule. A commercial break schedule may include a final or complete schedule of the spots that are to appear during a specified period of television programming such as hours, days, weeks, or a combination thereof.

Various embodiments of the disclosure, the television advertisement scheduling system 100, may comprise a spot scheduler solver 110 and an advertisement scheduler 112. Although the spot scheduler solver 110 and the advertisement scheduler 112 are illustrated as separate entities, they may be integrated as a single entity in which the advertisement scheduler 112 may be enabled or disabled utilizing, for example, one or more parameters. The television advertisement scheduling system 100 may be operable to electronically receive, via the communication network 120, deals comprising advertisers orders from the plurality of advertiser order generation systems 130a, . . . , 130n. The spot scheduler solver 110 may be operable to receive an advertiser's order to place one or more spots into one or more commercial breaks. The advertiser's order comprises airing constraints and placement requirements corresponding to the one or more spots, and each of the one or more commercial breaks comprises a plurality of inventory buckets. The airing constraints corresponding to each of the one or more spots comprise one or more of network constraints, selling title constraints, inventory type constraints, allowable date and time constraints, and advertiser conflict constraints. The placement requirements corresponding to each of the one or more spots comprise one or more of associative constraints, position constraints, time separation constraints, franchise and/or title exclusion constraints, and spot pinning constraints. The associative constraints define the positioning of any two or more spots relative to each other within the same one of the at least one of the plurality of inventory buckets or in adjacent inventory buckets. The position constraints define the positioning of any one spot in one of the at least one of the plurality of inventory buckets and/or in a commercial break.

A position of each of the plurality of inventory buckets within each of the one or more commercial breaks may define a sequencing order of each of the inventory buckets within each of the one or more commercial breaks, and each of the plurality of inventory buckets comprise a corresponding inventory type that indicates a type of content in each of the plurality of inventory buckets. The spot scheduler solver 110 may be operable to assign each of the one or more spots to at least one of the plurality of inventory buckets that are within each of the one or more commercial breaks based on the airing constraints and placement requirements. The spot scheduler solver 110 may be operable to match the characteristics of the assigned at least one of the plurality of inventory buckets that are within each of the one or more commercial breaks with the airing constraints and requirements of each of the one or more spots. The spot scheduler solver 110 may be operable to rank the one or more spots that are within each of the assigned at least one of the plurality of inventory buckets that are within each of the one or more commercial breaks based on the matching such that the airing constraints and placement requirements corresponding to the one or more spots are fulfilled. The spot scheduler solver 110 may be operable to reshuffle the one or more spots that are within each of the assigned at least one of the plurality of inventory buckets that are within each of the one or more commercial breaks. When at least one of the one or more spots are not assigned to the at least one of the plurality of inventory buckets that are within each of the one or more commercial breaks because of conflicts, the spot scheduler solver 110 may be operable to perform a prioritization scheme to complete the assignment of the one or more spots that are not assigned. The spot scheduler solver 110 may be operable to prioritize the spots based on arrival lead time such that all spots for a particular order are given same priority, and priorities are chosen such that a sum of all priorities post a certain arrival time is less than a priority on any spot prior to the certain arrival time. The spot scheduler solver 110 may also be operable to maximize the sum of the rates corresponding to the one or more spots. The spot scheduler solver 110 may also be operable to maximize the spread of days in which the one or more spots occur over the duration of the commercial break schedule. The spot scheduler solver 110 may be operable to generate a commercial break schedule based on the completed assignment of the one or more spots that are not assigned.

The spot scheduler solver 110 may also be operable to receive an additional advertiser's order to place one or more additional spots into the one or more commercial breaks, wherein the additional advertiser's order comprises constraints and placement requirements corresponding to the one or more additional spots. The spot scheduler solver 110 may also be operable to assign each of the one or more spots and the one or more additional spots to at least one of the plurality of inventory buckets within the one or more commercial breaks based on the corresponding constraints and placement requirements. When at least one of the one or more spots and the one or more additional spots is not assigned because of conflicts, the spot scheduler solver 110 may also be operable to a perform a prioritization scheme to complete the assignment of the at least one spot that is not assigned. The spot scheduler solver 110 may also be operable to modify the generated commercial break schedule based on the completed assignment of the at least one spot that is not assigned. The spot scheduler solver 110 may be operable to communicate the generated commercial break schedule to the advertisement scheduler 112 for processing.

The advertisement scheduler 112 may be operable to receive the generated commercial break schedule, and determine a current indexing representative of the liability per pending spot for one or more of the deals. The advertisement scheduler 112 may be operable to reshuffle and prioritize the placement of the one or more spots based on one or more metrics such as a current indexing of the one or more deals in order to minimize liability associated with the one or more deals. The current indexing represents the projected liability of a pending spot and is determined based on what has already been aired, and what will be aired in the future. The reshuffling may be based on a forecast of expected viewership associated with the one or more deals. The advertisement scheduler 112 may be operable to generate a finalized commercial break schedule based on the reshuffling and apply the finalized schedule to the log. It should readily be understood by one of skill in the art that the other metrics other than the current indexing, which represents the projected liability per pending spot, may be utilized without departing from the spirit and scope of the various embodiments of the disclosure.

Figure 1B:
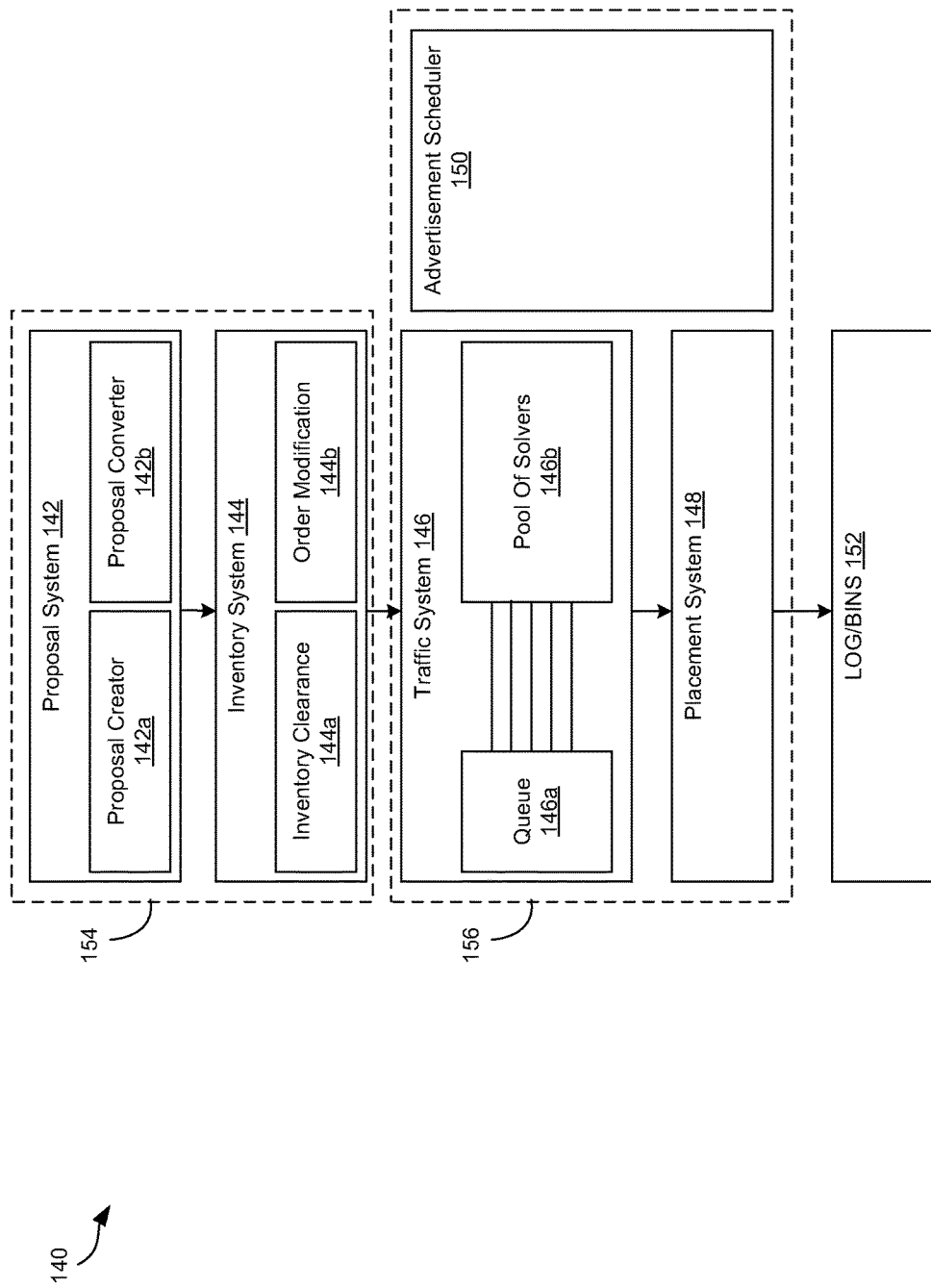
FIG. 1B is a diagram of the television advertisement management system, in accordance with an exemplary embodiment of the disclosure.

FIG. 1B is a diagram of the television advertisement management system, in accordance with an exemplary embodiment of the disclosure. Referring to FIG. 1B, there is shown a television advertisement management system 140, which may be similar to the television advertisement management system 100 of FIG. 1A. The television advertisement management system 140 comprises proposal system 142, inventory system 144, traffic system 146, placement system 148, and advertisement system 150. The proposal system 142, and the inventory system 144 may be referred to as an order booking system 154. The traffic system 146 and the advertisement schedule 150 may be referred to as a spot scheduler 156.

The proposal system 142 comprises hardware systems that are operable to create and negotiate proposals with the advertiser order generation systems 130a, ..., 130n, which are illustrated in FIG. 1A, to produce one or more deals. A negotiated deal may have one or more orders. Each order is specific to a single network for a single brand. The same order may not span multiple networks. The proposal system 142 comprises proposal creator 142a, and proposal converter 142b. The proposal creator 142a is operable to create and negotiate the proposals. The proposal converter 142b is operable to accept and convert the negotiated proposals to one or more orders.

The inventory system 144 comprises inventory clearance system 144a, and order modification system 144b. The inventory clearance system 144a is operable to clear the orders based on available inventory. The orders may be cleared, for example, on a first come first serve (FCFS) basis. When an order is received, the order may specify the x units be placed in selling title week A, y units be placed in selling title week B, and z units be placed in selling title week C, for example. Since there may be multiple bookings occurring, the inventory clearance system 144a ensures the availability of the inventory for booking the required units for the order. The order modification system 144b may be operable to change the attributes associated with an order that has already cleared inventory, add one or more units for an order to the inventory, or delete one or more units from inventory.

The traffic system 146 may comprise suitable hardware that may be operable to receive cleared and/or modified orders and queue them for assignment to an available spot scheduler solver. In this regard, the traffic system 146a may comprise a hardware queue 146a, and a plurality of spot scheduler solvers 146b. The queue 146a may be operable to queue cleared and/or modified orders by the traffic system 146. The traffic system 146 may assign the cleared and/or modified orders that are queued in the queue 146a to an available spots scheduler solver in the pool of spot scheduler solvers 146b for spot scheduling. The placement system 148 is operable to place the spots on the logs/bins 152 based on the results from the spot scheduler solvers.

The advertisement scheduler 150 may be operable to receive the generated commercial break schedule, determine a current indexing representative of the liability per pending spot for one or more of the deals, reshuffle and prioritize the placement of the one or more spots based on one or more metrics such as a current indexing of the one or more deals in order to minimize liability associated with the one or more deals. The reshuffling may be based on a forecast of expected viewership associated with the one or more deals. The advertisement scheduler 150 generates a finalized commercial break schedule based on the reshuffling and applies the finalized schedule to the log.

Orders requiring advertisement scheduling may be processed by the advertisement scheduler 150 and placed on the logs/bins based on the results from the advertisement scheduler 150.

Figure 1C:
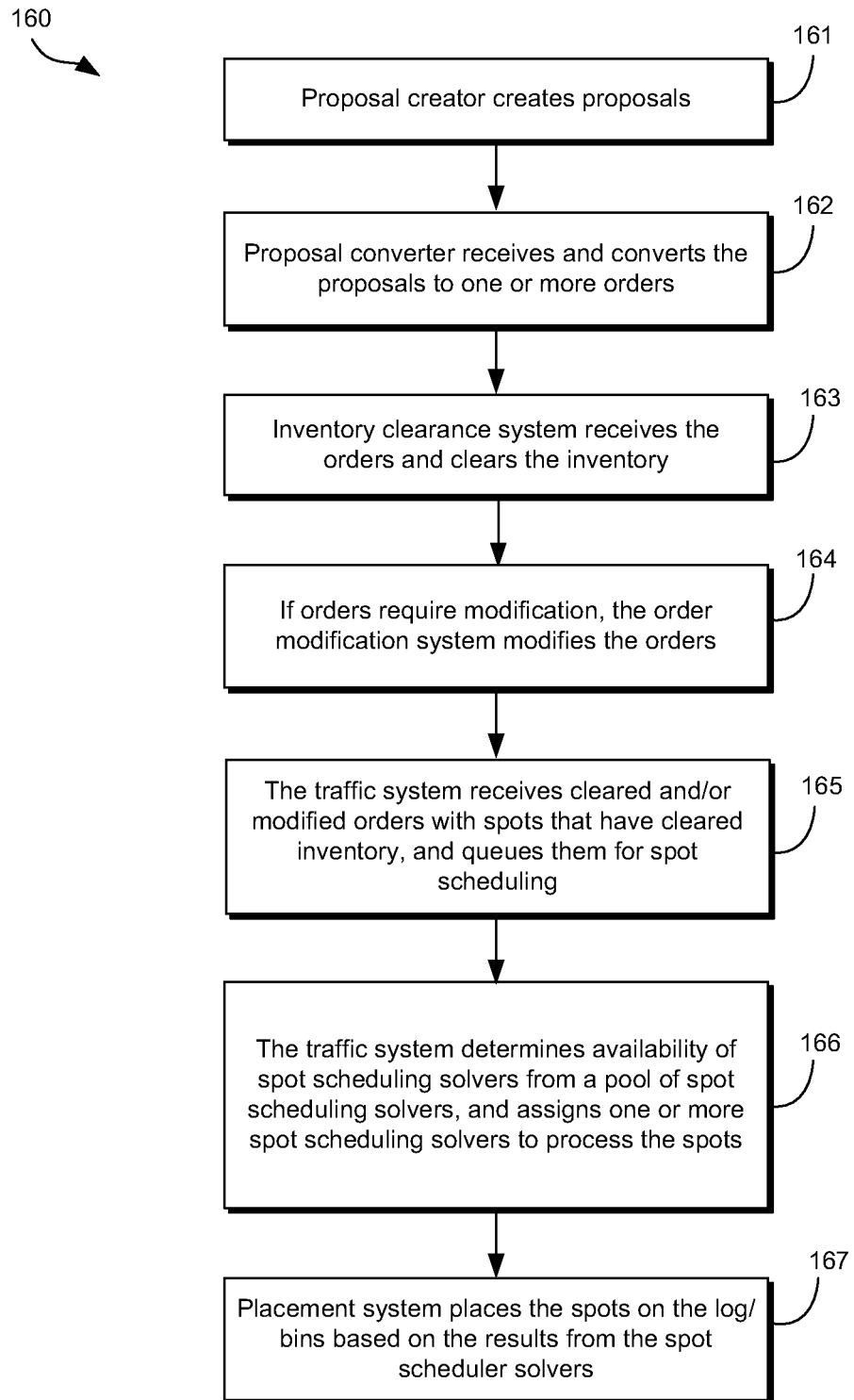
FIG. 1C is a flow chart illustrating high-level operation of the television advertisement management system of FIG. 1B, in accordance with an exemplary embodiment of the disclosure.

FIG. 1C is a flow chart illustrating high-level operation of the television advertisement management system of FIG. 1B, in accordance with an exemplary embodiment of the disclosure. Referring to FIG. 1C, there are shown exemplary steps 161 through 167. In step 161, the proposal creator 142a creates proposals. In step 162, the proposal converter 142b receives and converts the proposals to one or more orders. In step 163, the inventory clearance system 144a receives the orders and clears the inventory. In step 164, if orders require modification, the order modification system 144b modifies the orders. In step 165, the traffic system 146 receives cleared and/or modified orders with spots that have cleared inventory and queues them in the queue 146a for spot scheduling. In step 166, the traffic system 146 determines availability of spot scheduling solvers from a pool of spot scheduling solvers 146b, and assigns one or more spot scheduling solvers to process the spots. In step 167, the placement system 148 places the spots on the log/bins 152 based on the results from the spot scheduler solvers.

Figure 2:
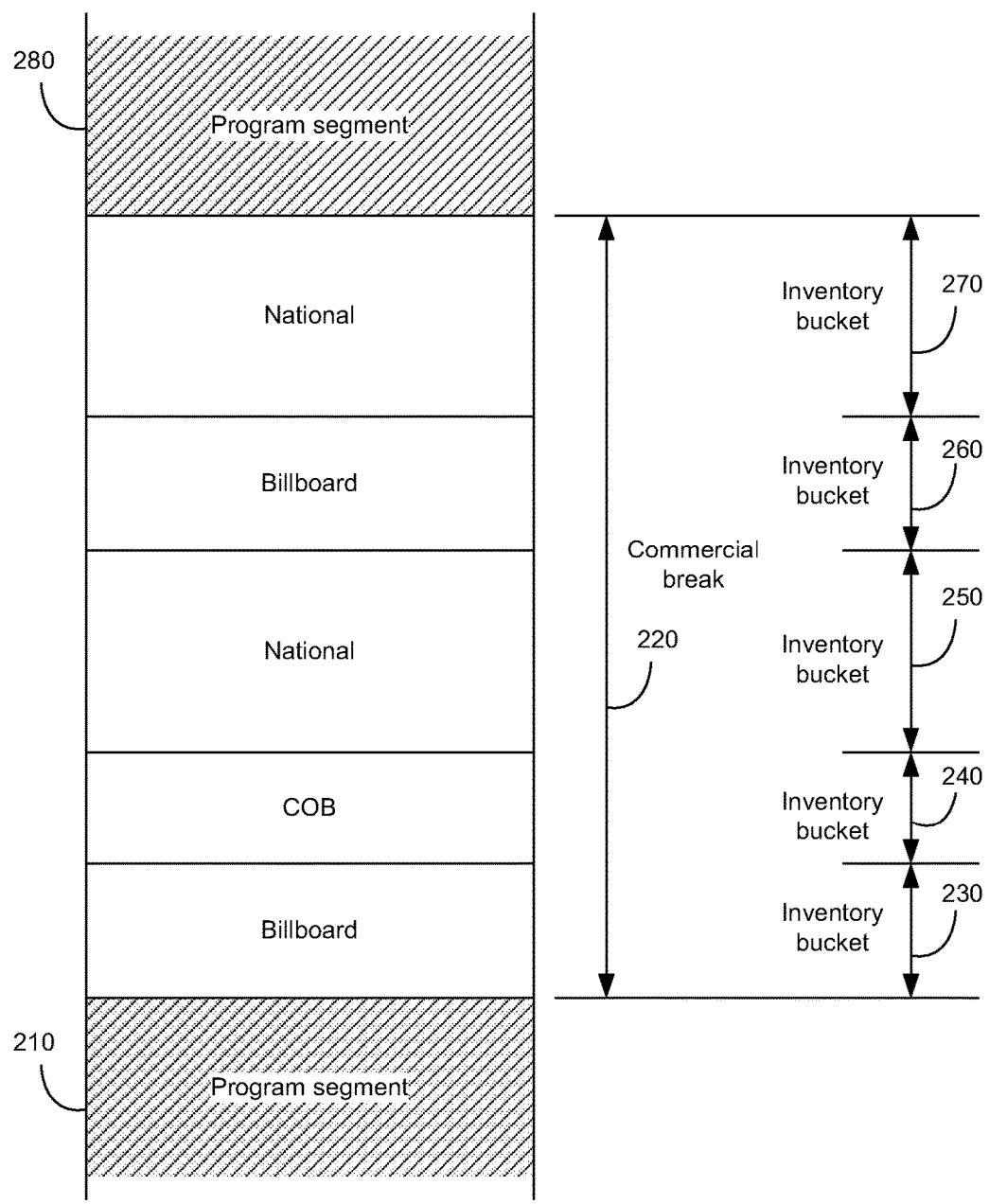
FIG. 2 is a diagram that illustrates an exemplary commercial break, in accordance with an exemplary embodiment of the disclosure.

FIG. 2 is a diagram that illustrates an exemplary commercial break, in accordance with an exemplary embodiment of the disclosure. Referring to FIG. 2, there is shown a commercial break 220 that occurs between a programming segment 210 and a programming segment 280. The commercial break 220 may comprise an inventory bucket 230 corresponding to a billboard inventory type, an inventory bucket 240 corresponding to a cable operator break (COB) inventory type, an inventory bucket 250 corresponding to a national inventory type, an inventory bucket 260 also corresponding to a billboard inventory type, and an inventory bucket 270 also corresponding a national inventory type. The inventory buckets 230, 240, 250, 260, and 270 shown in FIG. 2 may have different duration and may comprise one or more slots into which advertisement spots can be placed. The commercial break 220 and its corresponding inventory buckets are provided for purposes of illustration and not of limitation. During television programming, the duration, number, and/or type of inventory buckets in commercial breaks may vary.

The spot scheduler solver 110 described above may be operable to place one or more spots into the inventory buckets of commercial breaks such as the commercial break 220. In doing so, the spot scheduler solver 110 may solve the placement of incoming spots into open or available inventory buckets in accordance with the constraints and requirements of each spot. A commercial break, such as the commercial break 220, may comprise a set of characteristics that are taken into account by the spot scheduler solver 110. Those characteristics include, but need not be limited to, a network (e.g., TNT, TBS), a week/day/time of airing, an inventory type corresponding to each of the inventory buckets, a selling title, a franchise and title, and a position in the commercial break.

The network refers to the particular network that is delivering the linear media and the commercial spots. A programmer may operate more than one network and it may be necessary to indicate to which network is the spot assigned. The week/day/time of airing refers to the unique airing time of an inventory bucket, which his defined by week, day, and time. The inventory type refers to the type of content in a particular inventory bucket. As shown in FIG. 2, the different types of inventory include, but need not be limited to, national, billboard, and COB inventory types.

The selling title may refer to the program in which the inventory bucket airs (e.g., Friends, Seinfeld) or may be defined as a specific block of time (e.g., Prime time—usually 8-10 p.m., or Day Time—usually from 10 a.m. to 3 p.m.). In this regard, the inventory bucket inherits the selling title in which it is scheduled. The franchise and title may provide further detail to the selling title characteristic of the inventory bucket. For example, the inventory bucket may correspond to the selling title Daytime, the franchise "Married with children" and the title "Peggy gets a break." In this example, the inventory bucket may inherit the selling title as well as the franchise and title. The position in the commercial break may be used to define the sequencing or the order of the inventory buckets that belong to the same commercial break.

The spot scheduler solver 110 may match the characteristics of the inventory buckets in the commercial breaks with the constraints and requirements of each of the spots to be placed. The basic constraints corresponding to each spot include, but need not be limited to, a network, a selling title, an inventory type, an allowable week/day/time, and an advertiser conflict code. These constraints are substantially similar to the characteristics of the inventory buckets and are used to match the two. The advertiser conflict code refers to a conflict code that describes similar products or advertisers that are not to exceed a pre-determined number of occurrences in a commercial break. For example, the advertiser conflict code may indicate that no more than one automobile commercial is to be allowed in the same commercial break.

In addition to the basic constraints, each spot may have one or more placement requirements that are to be taken into account by the spot scheduler solver 110. These placement requirements may include, but need not be limited to, associative constraints, position constraints, time separation constraints, franchise and title exclusion constraints, and spot pinning constraints.

The associative constraints may include, but need not be limited to, a piggyback constraint, a bookend constraint, a sandwich bookend constraint, and an associated billboard constraint. The piggyback constraint refers to the placement requirement of having two spots of the same inventory type placed back-to-back in the same inventory bucket. The bookend constraint refers to the placement requirement of having two spots of the same inventory type air in the same inventory bucket with at least one spot in between the two. The sandwich bookend constraint refers to the placement requirement of having three spots of the same inventory type air in the same inventory bucket with at least one spot in between any two of them. The associated billboard constraint refers to the placement requirement of having one national and one billboard inventory type spots air adjacent to each other, that is, each may be placed in the corresponding inventory bucket, one at the bottom, and one at the top, such that they air immediately one after the other.

The position constraints may include, but need not be limited to, a break range constraint, a break position constraint, and an inventory bucket position constraint. The range constraint refers to the placement requirement of having a spot placed within a specific commercial break range, which may comprise a single commercial break or multiple commercial breaks. The break position constraint refers to the placement requirement of having a spot placed in the first position, the second position, the next to last position, or the last position in a commercial break. The inventory bucket position constraint refers to the placement requirement of having a spot placed in the first position, the second position, the next to last position, or the last position in an inventory bucket.

The time separation constraint may refer to an advertiser's placement requirement that some of the spots be aired at least a certain time apart. This placement requirement can be requested at the brand level. An advertiser may have one or more brands associated with it (e.g., Procter & Gamble's brands include Duracell, Tide, Folgers). In one example, for a first order, the time separation constraint may require that spots from Procter & Gamble be separated by at least 30 minutes (advertiser level time separation), but in a second order, Zspots from Procter & Gamble's Duracell brand be separated by at least 60 minutes (brand level time separation). In this example, all spots from the advertiser Procter & Gamble are separated by at least 30 minutes, and, in addition, the spots corresponding to the brand Duracell are separated by at least 60 minutes.

The franchise and title exclusion constraint may refer to the placement requirement that a spot have a corresponding list of one or more franchises and/or titles with which that spot is not allowed to air.

The spot pinning constraint may refer to the placement requirement in which a spot is forced or pinned to a specific slot in an inventory bucket. As long as the pinned spot does not violate constraints or requirements corresponding to the spot other than conflict code and time separation, the spot scheduler solver 110 is to honor the pin. The pinned spots may be allowed to violate time separation and conflict code constraints among themselves. For example, when the maximum number of allowable cars spots in a commercial break is one (1), but two (2) car spots have already been pinned to that commercial break, the car spots that are already pinned are allowed to stay in the commercial break. In such an instance, an unpinned car spot is not allowed to be scheduled for that commercial break. When, for example, the maximum number of allowable cars spots in a commercial break is three (3), not more than one additional unpinned car spot is allowed to be scheduled for that commercial break. Similar approaches may be followed when allowing pinned spots to violate time separation constraints.

As described above, the spot scheduler solver 110 in the television advertisement scheduling system 100 takes into account the characteristics of the commercial breaks and of their inventory buckets, as well as the constraints and requirements of the spots to be placed, and produces a commercial break schedule with the spots placed in accordance with the advertisers' requests.

Figure 3:
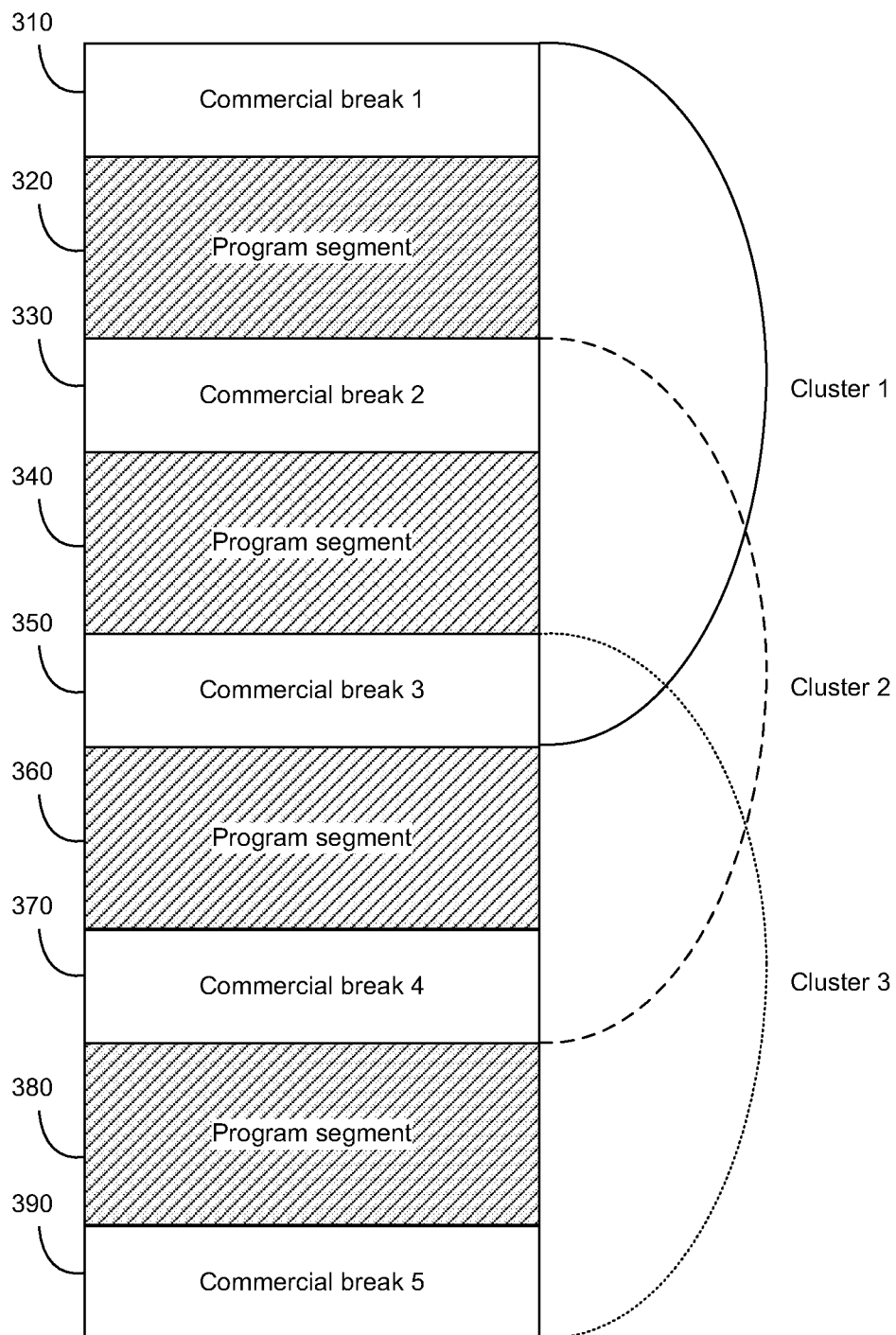
FIG. 3 is a diagram that illustrates exemplary clusters associated with the use of time separation constraints, in accordance with an exemplary embodiment of the disclosure.

FIG. 3 is a diagram that illustrates exemplary clusters associated with the use of time separation constraints, in accordance with an exemplary embodiment of the disclosure. Referring to FIG. 3, there are shown commercial breaks 310, 330, 350, 370, and 390, which are separated by program segments 320, 340, 360, and 380. The commercial breaks and program segments shown in FIG. 3 are provided to illustrate an example of how the spot scheduler solver 110 handles time separation constraints.

The time separation between any two spots can be the time between the beginnings of the two inventory buckets on which the spots have been placed. The time separation constraint may be modeled as a linear constraint. In a pre-processing step, the spot scheduler solver 110, for example, may generate clusters of commercial breaks containing consecutive inventory buckets within the selling title for a time span equal to the required time separation. For example, the time between the first and the last inventory bucket in each cluster may be less than the time separation required, but the time between the first two inventory buckets in two consecutive clusters may exceed the time separation required. The clusters generated by the spot scheduler solver 110 are pictured in FIG. 3. Cluster 1 is shown in a solid line and spans from the beginning of commercial break 1 (310) to the end of commercial break 3 (350). Cluster 2 is shown in a dashed line and spans from the beginning of commercial break 2 (330) to the end of commercial break 4 (370). Cluster 3 is shown in a dotted line and spans from the beginning of commercial break 3 (350) to the end of commercial break 5 (390). The time separation constraint in this example enforces no more than one spot to be scheduled per overlapping clusters. For example, if a spot is placed in commercial break 2 that belongs to both, cluster 1 and cluster 2 in FIG. 3, then the next spot may only be placed in the last commercial break that belongs to cluster 3, but not in any other commercial break that belongs to cluster 1 or to cluster 2.

Other time separation constraints, different from the one example shown in FIG. 3, may be implemented or utilized when placing one or more spots by the spot scheduler solver 110.

In another embodiment of the disclosure, the spot scheduler solver 110 may also maximize the spread of spots within a day based on one or more vertical constraints. The vertical constraint operation may be similar to that used when considering time separation constraints. That is, having a desired number of spots per day for each advertiser, the spot scheduler solver 110 may determine a desired distance between two spots on each day by dividing the total number of inventory buckets on that day with the desired number of spots. The result may then be used then to calculate clusters as in the time separation constraint example shown in FIG. 3, and the deviation from having one spot per each such cluster may be minimized by the spot scheduler solver 110. This operation may be performed when, for example, the calculations necessary to spread spots within a day can be carried out within a certain pre-determined amount of time such that the commercial break schedule can be generated and subsequently applied to the log at the appropriate time.

Figure 4A:
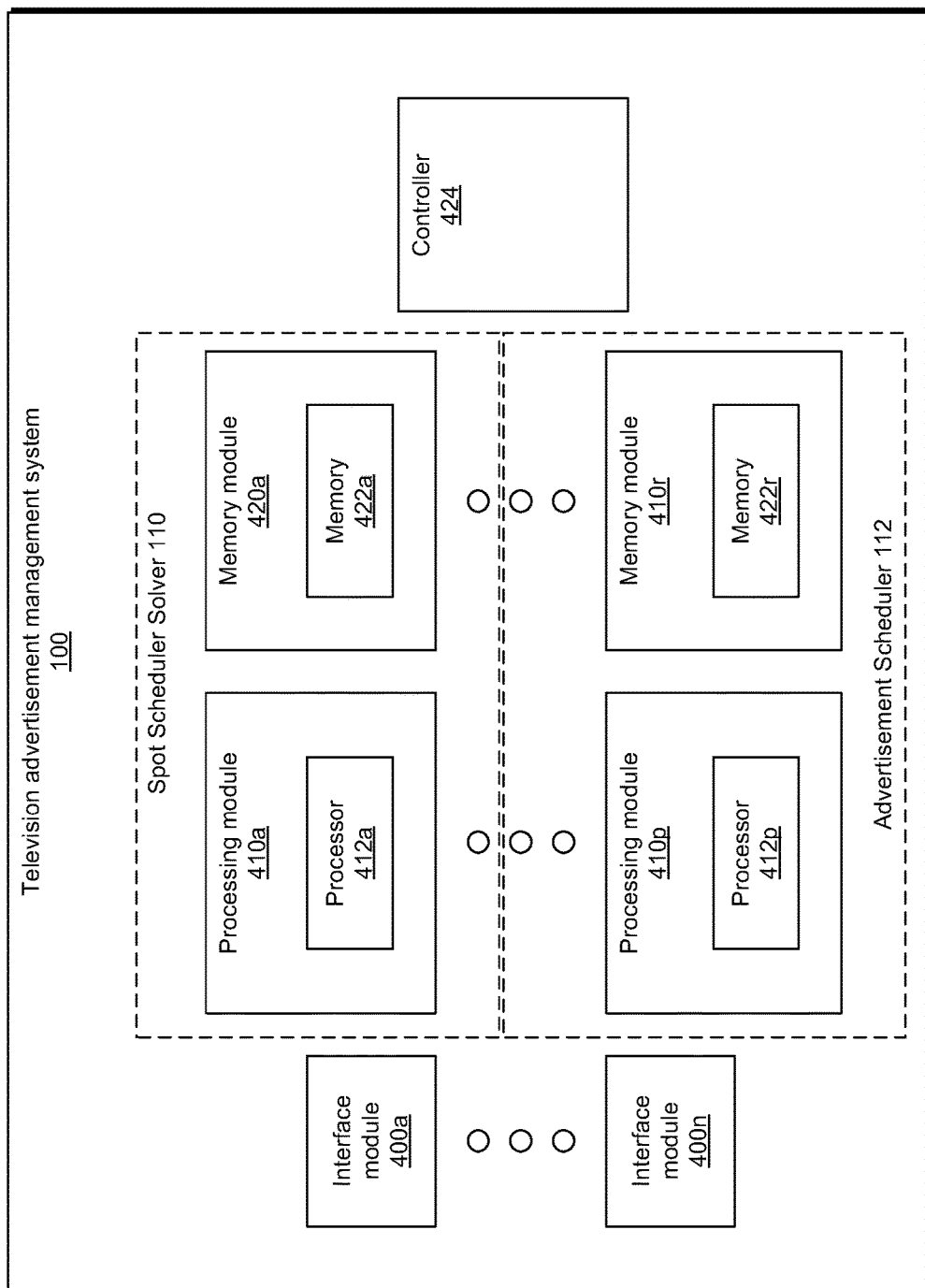
FIG. 4A is a block diagram that illustrates an exemplary television advertisement management system, in accordance with an exemplary embodiment of the disclosure.

FIG. 4A is a block diagram that illustrates an exemplary television advertisement scheduling system, in accordance with an exemplary embodiment of the disclosure. Referring to FIG. 4A, there is shown the television advertisement management system 100 described above with respect to FIG. 1A. The television advertisement management system 100 may comprise interface modules 400a, . . . , 400n, processing modules 410a, . . . , 410p, and memory modules 420a, . . . , 420r. Each of these modules or components may interact with one or more of the other modules or components in the television advertisement management system 100.

Each of the interface modules 400a, . . . , 400n may comprise suitable logic, circuitry, code, and/or interface that may be operable to communicate with one or more entities, applications, sources, systems, and/or networks external to the television advertisement management system 100. For example, the television advertisement management system 100 may communicate with the advertiser order generation systems 130a, . . . , 130n via one or more of the interface modules 400a, . . . , 400n. Each of the interface modules 400a, . . . , 400n may comprise specialized hardware and/or interfaces that may enable the television advertisement management system 100 to communicate with the advertiser order generation systems 130a, . . . , 130n and receive deals. In this regard, the interface modules 400a, . . . , 400n may include suitable logic, circuitry, and interfaces, which may be operable to communicate with one or more of a cable television network, the Internet, a satellite communication network, a wide area network (WAN), a medium area network (MAN), and a local area network (LAN).

Each of the processing modules 410a, . . . , 410p may comprise suitable logic, circuitry, code, and/or interface that may be operable to process data. Each of the processing modules 410a, . . . , 410p may comprise one or more hardware processors such as central processing units (CPUs), digital signal processors (DSPs), custom data processors, or the like. For example, the processing module 410a may comprise a hardware processor 412a. Similarly, the processing module 410p may comprise a hardware processor 412p.

Each of the memory modules 420a, . . . , 420r may comprise suitable logic, circuitry, code, and/or interface that may be operable to store data. In this regard, each of the memory modules 420a, . . . , 420r may comprise one or more hardware memory devices, which are based on one or more of DRAM, SRAM, Flash, and/or other memory technologies. For example, the memory module 420a may comprise a hardware memory device 422a. Similarly, the memory module 420r may comprise a hardware memory device 422r. The hardware memory devices 422a, 422r, may comprise computer-readable medium, which may comprise non-transitory computer-readable medium. Accordingly, code stored on the hardware memory devices 422a, 422r comprising non-transitory computer-readable medium may be executed by the hardware processor 412a, 412p, respectively.

The controller 424 may comprise suitable logic, circuitry, code, and/or interface that may be operable to control operation of the components within the television management system 100. In this regard, the controller 424 may comprise one or more hardware processors such as central processing units (CPUs), digital signal processors (DSPs), custom data processors, or the like. The controller 424 may be operable to control one or more of the processing modules 410a, . . . , 410p, and/or memory modules 420A, . . . , 420r to perform operations for the spot scheduler solver 110, and the advertisement scheduler 112. In this regard, the controller 424 may be operable to select one or more of the processing modules 410a, . . . , 410p and/or the memory modules 420a, . . . , 420r to handle operations for the spot scheduler solver 110, and the advertisement scheduler 112.

Each of the spot scheduler solver 110 and the advertisement scheduler 112, which are described above with respect to FIG. 1A, may be implemented using one or more of the components of the television advertisement management system 100 shown in FIG. 4A. For example, the spot scheduler solver 110, and/or the advertisement scheduler 112 may be implemented using IBM ILOG CPLEX (general purpose optimization software) and custom Microsoft .NET (general purpose software development software) code implemented in OPL (Optimization Programming Language) and C++ respectively, which may be executed by one or more hardware processors 412a, . . . , 412p. These applications and/or programs, and the data used by them, may be stored in one or more of the memory modules 420a, . . . , 420r. Moreover, these applications and/or programs may be executed by one or more of the processors in the processing modules 410a, . . . , 410p.

It should readily be understood that although FIG. 4A illustrates an integrated system for handling processing operations for the spot scheduler solver 110 and the advertisement scheduler 112, the various embodiments of the disclosure are not limited in this regard. Accordingly, in other embodiments of the disclosure, one or more of the processing modules 410a, . . . , 410p and/or the memory modules 420a, . . . , 420r may be dedicated to handling the spot scheduler solver 110, and a remaining portion of the processing modules 410a, . . . , 410p and/or the memory modules 420a, . . . , 420r may be dedicated to handling advertisement scheduler 112. Such an exemplary dedicated implementation is illustrated in FIG. 4B.

Figure 4B:
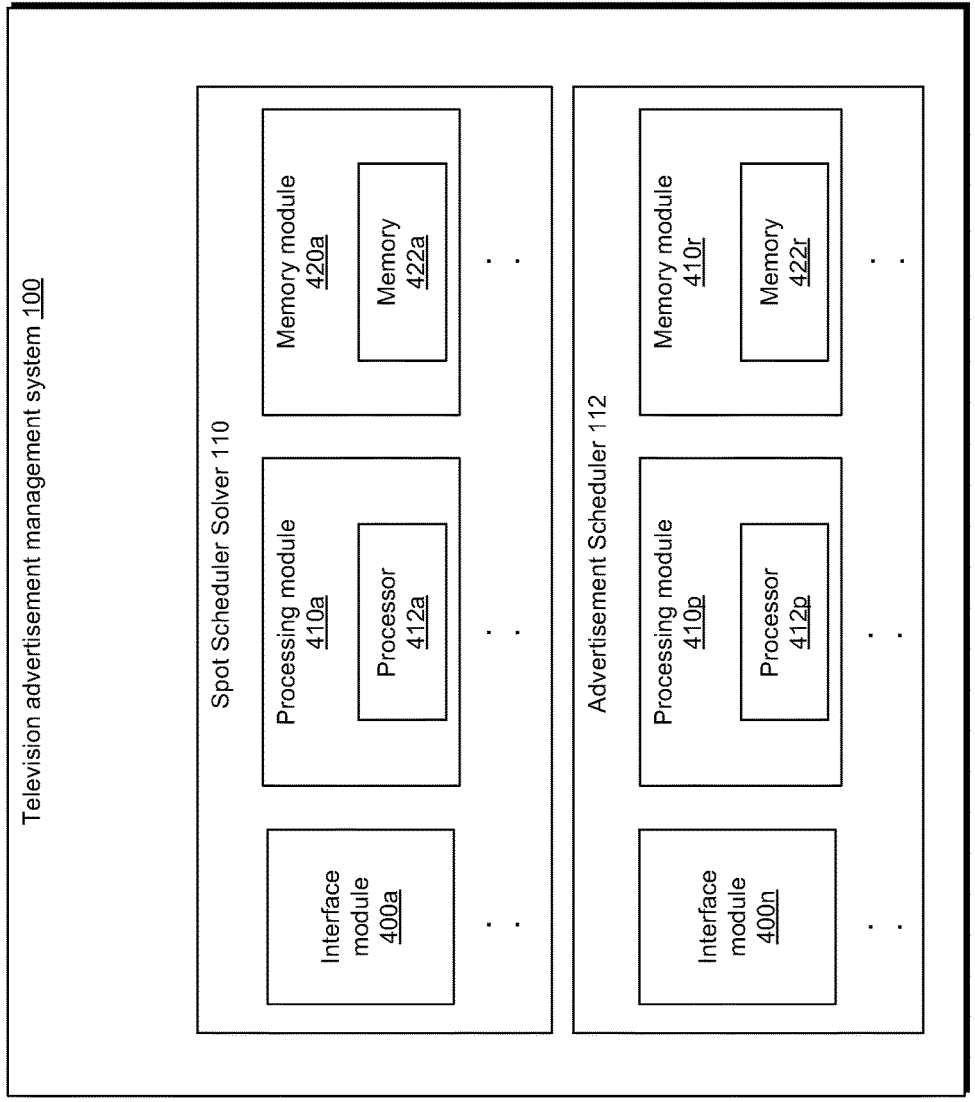
FIG. 4B is a block diagram that illustrates an exemplary television advertisement scheduling system with dedicated processing elements for handling the spot scheduler solver, and the advertisement scheduler, in accordance with an exemplary embodiment of the disclosure.

FIG. 4B is a block diagram that illustrates an exemplary television advertisement scheduling system with dedicated processing elements for handling the spot scheduler solver, and the advertisement scheduler, in accordance with an exemplary embodiment of the disclosure. Referring to FIG. 4B, there is shown the television advertisement management system 100 described above with respect to FIG. 1A. The television advertisement management system 100 may comprise spot scheduler solver 110, and advertisement scheduler 112.

The spot scheduler solver 110 may comprise a hardware processor that may include dedicated components, for example, interface module 400a, processing module 410a, and/or memory module 420a. The processing module 410a may comprise hardware processor 412a. The memory module 420a may comprise hardware memory 422a.

The advertisement scheduler 112 may comprise a hardware processor that may include dedicated components, for example, interface module 400n, processing module 410p, and/or memory module 410r. The processing module 410p may comprise hardware processor 412p. The memory module 410r may comprise hardware memory 422r.

The advertisement scheduler 112 may be operable to generate a model that may be utilized to predict demographics of interest where people purchase from. In this regard, the advertisement scheduler 112 may generate a demographics estimate, for every demographics, for every network (eg. TBS, Cartoon Network, Turner Classics, . . . ), for every 30-minute interval or segments, and for a specified interval or period, for example, 7 days. In an example implementation, the advertisement scheduler 112 may generate a matrix comprising the demographics estimates, for every demographics, for every network, for every 30-minute interval, and for the 7-day period. The resulting estimates may be updated or adjusted throughout and/or at the end of the 7-day period based on actual ratings that may be received. Estimates may be generated prior to start of the advertisement scheduling using historical data for forecasting. For example, the actual ratings may be measurement or rating data for segments such as Nielsen ratings.

In accordance with an exemplary embodiment of the disclosure, the resulting estimates or the updated/adjusted estimates may be weighted by a weighting factor. The weighting factor may be generated based on analysis of historical analysis of demographics estimates, for every demographics, for every network including what is airing on the networks of competitors, at the 30-minute interval, and for an extended period, for example, one or more months, or one or more years. The weighting factor may take on a range of values, each of which may be updated.

In instances where the estimates may be dependent on previous estimates, then a weighting factor may be utilized in combination with the previous estimate to weigh the error of the previous estimate and measurement. The weighting factor may be: (i) a constant: it may be a system parameter chosen based on data and model performance analysis, for example, prior to system roll out. This constant can be reassessed, if need, periodically e.g. yearly; (ii) time-varying: the weight changes at every time step depending on the estimates and observations variance; (iii) adaptive: the weight changes at every time step as a function of the estimates error variance. In this regard, the adaptive weight may be viewed as time varying as a function of error.

The advertisement scheduler 112 may be operable to generate a forecast for the next week, examine the deals to see which may be hurting the most, select those deals that are hurting the most, and preferentially place them.

Figure 4C:
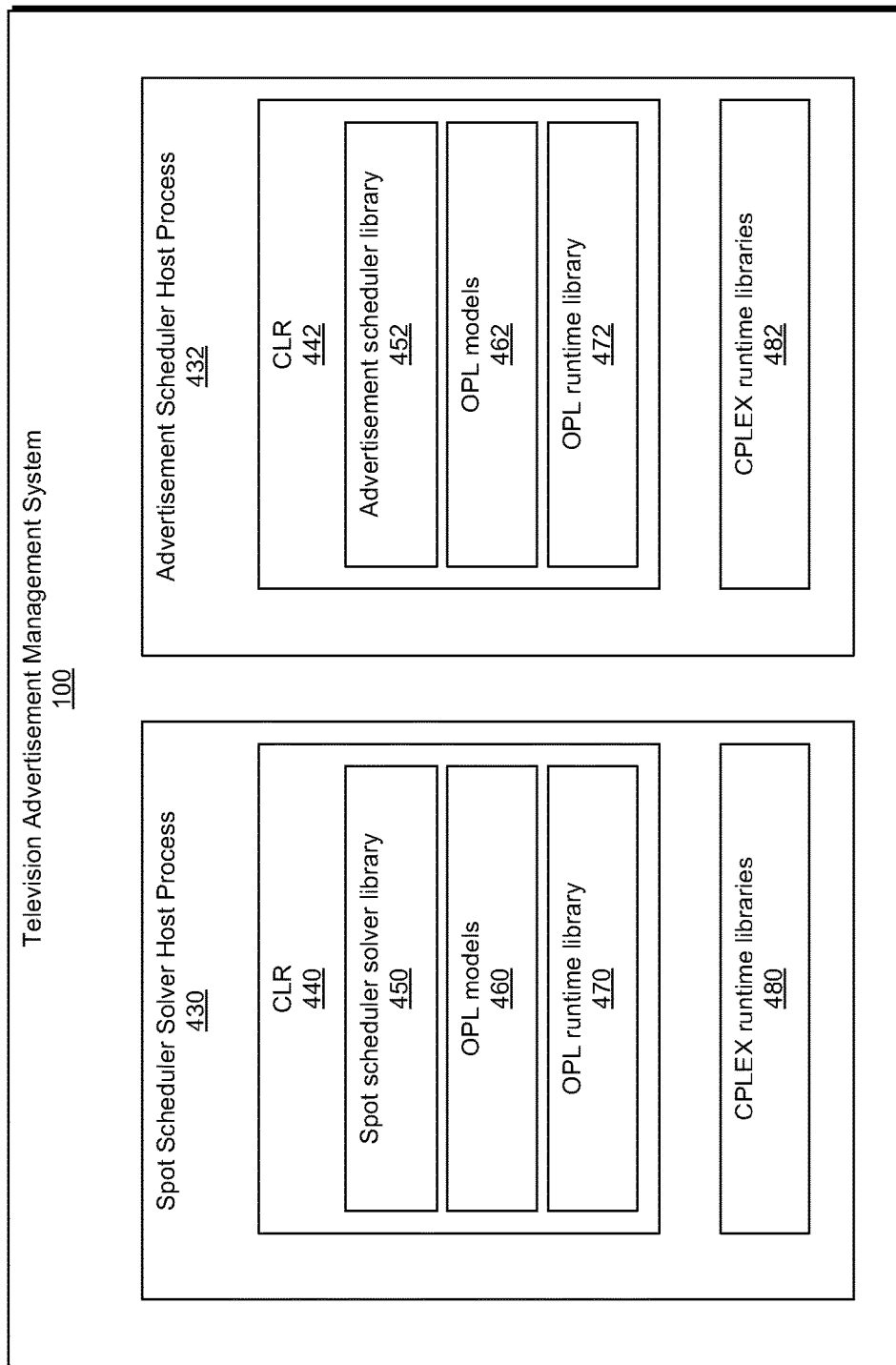
FIG. 4C is a block diagram that illustrates an exemplary architecture for a spot scheduler solver host process in the television advertisement management system of FIG. 4A, in accordance with an exemplary embodiment of the disclosure.

FIG. 4C is a block diagram that illustrates an exemplary architecture for a spot scheduler solver host process and an advertisement scheduler host process in the television advertisement management system of FIG. 4A, in accordance with an exemplary embodiment of the disclosure. Referring to FIG. 4C, there is shown the television advertisement management system 100 described above with respect to FIG. 1A. A spot scheduler solver host process 430, and an advertisement scheduler host process 432 are also shown, each of which may be run or executed in the television advertisement management system 100. The spot scheduler solver host process 430 may be an implementation of the spot scheduler solver 110. The advertisement scheduler host process 432 may be an implementation of the advertisement scheduler 112.

The spot scheduler solver host process 430 may be based on an executable program (e.g., SpotSchedulerSolverHost.exe), which may be run or executed using one or more of the modules or components described in FIG. 4A. The spot scheduler solver host process 430 may comprise a common language runtime (CLR) 440 and CPLEX runtime libraries 480. The CLR 440 may provide a runtime execution environment. For example, the CLR 440 may correspond to a virtual machine such as a virtual machine component in a .NET framework that is responsible for managing the execution of .NET programs. The CLR 440 may compile intermediate language code into machine instructions that are executed by one or more processors in the television advertisement management system 100. Moreover, the CLR 440 may provide other services that include, but need not be limited to, memory management and/or exception handling.

The CPLEX runtime libraries 480 may correspond to libraries used by a CPLEX Optimizer, such as the IBM ILOG CPLEX described above, for example. The CPLEX runtime libraries 480 may be based on dynamic-link library (DLL) files, for example.

The CLR 440 may provide a runtime execution environment for a spot scheduler solver library 450, OPL models 460, and an OPL runtime library 470. The spot scheduler solver library 450 may correspond to one or more libraries used to implement the functions and/or operations that correspond to the spot scheduler solver 110. The spot scheduler solver library 450 may be based on one or more DLL files (e.g. SpotSchedulerSolver.dll). The OPL Models 460 may correspond to one or more optimization scripts used to implement the functions and/or operations that correspond to the spot scheduler solver 110. The OPL runtime library 470 may correspond to one or more libraries used to implement the optimization scripts corresponding to the OPL Models 460. The OPL runtime library 470 may be based on one or more DLL files (e.g., OPLALLss.dll).

The implementation described above enables the spot scheduler solver 110 to use advanced mathematical models and optimization applications and techniques to effectively and efficiently honor the advertiser's constraints and requirements. Nevertheless, the implementation of the spot scheduler solver 110 need not be so limited and other tools, applications, programming languages, and/or software architectures may be utilized to implement the functions and/or features of the spot scheduler solver 110 in the television advertisement management system 100.

In addition to honoring the constraints and requirements described above for each of the spots being placed, the spot scheduler solver 110 may also be operable to spread the spots from the same advertiser across days as much as possible.

When placement conflicts occur in the assignment or placement of spots into inventory buckets in commercial breaks, the spot scheduler solver 110 may place the spots according to a lead time scheme or a rate scheme.

The lead time scheme may be used by the spot scheduler solver 110 to place as many spots as possible while maintaining an arrival priority such that sports with a larger lead time are placed over spots with a smaller lead time. This may be a hard constraint, which means that even if a spot that came in first prevents further spot placement, that spot may need to be placed if there is room for it. The objective is to place as many spots as possible honoring all the constraints.

The rate scheme may be used by the spot scheduler solver 110 to place spots such that the sum of all spot rates, that is, the amount of money paid by advertisers, is maximized. Spots with an earlier arrival time may still have a higher priority, but this may be a soft constraint, that is, the objective remains to maximize the amount of money paid by advertisers while placing earlier spots when breaking ties.

When running, executing, or operating the spot scheduler solver 110 in the television advertisement management system 100, the running time is preferred to be as low as possible since the spot scheduler solver 110 may need to solve, in some instances, up to 30,000 spot placements per day. One approach to improve the speed of operation of the spot scheduler solver 110 is to implement its operation using a two-process model. In this regard, the two-process model that corresponds to the spot scheduler solver 110 may be implemented using one or more of the processors in the in the processing modules 410a, . . . , 410p shown in FIG. 4A.

The first process in the model may assign the spots to inventory buckets, while ensuring the constraints attached to the spots are fulfilled. To reduce the problem size, the spots having associated constraints other than associated billboards may be concatenated together and treated as a single spot with length equal to the sum of the participating spot lengths. The spots having piggyback constraints may be automatically placed in the same inventory bucket. However, to ensure solution feasibility for the rest of the associative constraints to be run in the next or second process in the model, the first process may need to address certain aspects of associated billboards, bookend constraints, and/or sandwich bookend constraints.

With respect to associated billboards, a spot corresponding to a billboard may not be placed in the same inventory bucket as a spot requiring any position. For bookend constraints, when a bookend spot is assigned to an inventory bucket, there should be at least a certain amount of time left after subtracting the concatenated bookend, any spots corresponding to the billboards and placed in the same inventory bucket, and any spots requiring first or last position. The amount of time left may be a programmable parameter that may be set to, for example, 15 seconds.

For sandwich bookend constraints, the same approach as with bookend constraints may be followed. In this instance, the programmable parameter may be set to, for example, 45 seconds. The sandwich bookend constraint, however, may not exclude the case of having an inventory bucket filled with 3 sandwich bookends and 2 piggybacks (one of 30 seconds, one of 15 seconds), which would not be feasible since the 2 piggybacks have to run back-to-back. That is, for the tight inventory buckets containing sandwich bookends, the model should add an additional constraint that ensures there are at least 2 spots other than associated with billboards or piggybacks or required first or last position.

The spot scheduler solver 110 may also address in the first process aspects related to requiring spots to be placed in certain positions in commercial breaks or in inventory buckets. For example, spots with the same position requirement may not be placed in the same inventory bucket. A spot requiring a first inventory bucket position and one requiring a first commercial break position may not be scheduled for the same inventory bucket. The same approach may be valid for all other combinations. Moreover, spots with associated billboards may not be placed in the same inventory bucket with spots that have position requirements.

During the first process, the spot scheduler solver 110 may also consider horizontal constraints (across days). These are typically soft constraints, that is, they need not interfere with the acceptance of the spots, but with the distribution of the accepted spots. The horizontal rotation may require that the accepted spots for a certain advertiser be as evenly distributed across days as possible. For example, if an advertiser has 20 spots to be scheduled any day during the week (Monday through Friday), then the spot scheduler solver 110 may determine a placement goal to be 4 spots for that advertiser per day. The horizontal constraint may be utilized by the spot scheduler solver 110 to determine the deviation from the desired number of spots per day and to minimize the deviation.

In the first process, one or more of the processors associated with the spot scheduler solver 110 may be utilized to run the lead time scheme iteratively. The orders may be grouped according to their arrival time. Each group of orders has spots prioritized according to their arrival time. All the spots in a particular order are typically given the same priority. The priorities may be chosen such that the sum of all priorities post a certain arrival time is less than the priority on any spot prior that certain arrival time.

The spot scheduler solver 110 may be first run for the spots in the first group of orders. The spots that may be placed in the first run may be hard constrained to be placed in a next or second run corresponding to a second group of orders. The second run may have the spots that were already placed in the first run (flagged as placed) and the spots from the second group of orders (flagged as new). The iterations may continue until all orders are run. In this instance, the spot scheduler solver 110 may maximize the number of spots placed from the spots flagged as new in each run.

For each group of orders that is run, the spots can have one of the following three states: currently placed, previously placed, or never placed. These attributes are used to place spots that have the same arrival time. Currently placed spots may take priority over previously placed spots, which in turn may take priority over never placed spots. Currently placed spots that have been placed may be placed in the subsequent runs as well. Previously placed spots that have been placed at some point, but due to schedule changes may have been unplaced, may be placed if there is room after the currently placed spots are placed. Never placed spots may be placed if there is room after the currently placed spots and the previously placed spots have been placed.

When the rate scheme is utilized, the spot scheduler solver 110 may run it in the first process. For spots with the same rates, the arrival time of the spots may be considered as a priority. However, the arrival time is treated as a soft constraint. The horizontal constraints may also be run in the first process by the spot scheduler solver 110 as an additional iteration after all spots have been placed. The placed spots may be hard constrained to be placed and the spot scheduler solver 110 tries to minimize the total deviation from the desired horizontal of the spots.

In addition to the first process described above, the two-process model that corresponds to the spot scheduler solver 110 may include a second or subsequent process. For example, the second process may utilize the output from the first process descried above, which has the spots assigned to each inventory bucket, and may rank the spots inside each inventory bucket such that the constraints associated with those spots are fulfilled.

The output of the second process may provide a ranking for each spot within each inventory bucket by its begin time. The begin time of each spot may be required to be higher or the same as the begin time of its corresponding inventory bucket, and less or the same as the end time of its corresponding inventory bucket. The constraints that are considered by the spot scheduler solver 110 during the second process may include, but need not be limited to, associative constraints, inventory bucket position constraints, and commercial break position constraints. That is, the spot scheduler solver 110 may consider those constraints that may be utilized to enforce a certain rank on the corresponding spot. The second process may ensure that there is at least one spot between the two spots belonging to a bookend, that there are at least two spots between each two of the three spots belonging to a sandwich bookend, and that piggyback spots are placed back-to-back. The second process may also ensure that national inventory type spots having an associated billboard inventory type spot may be placed in the first positions of the national inventory bucket if the billboard inventory bucket is on the top of the national inventory bucket, or last positions of the national inventory bucket if the billboard inventory bucket is on the bottom of the national inventory bucket. The constraints for the first and last inventory bucket or commercial break positions ensure that the begin time of the spot is either the begin time or the end time of its corresponding inventory bucket. The constraint for the second inventory bucket or commercial break position ensures that there is at most one spot before the spot being place. The constraint for the second to last inventory bucket or commercial position ensures that there is at most one spot after the spot to be placed.

While a two-process model is described above for the spot scheduler solver 110, the disclosure need not be so limited. Other models may be utilized in which the functions and/or operations of the spot scheduler solver 110 are implemented and/or organized using a different number of processes.

The advertisement scheduler host process 432 may be based on an executable program (e.g., AdvertisementSchedulerHost.exe), which may be run or executed using one or more of the modules or components described in FIG. 4A. The advertisement scheduler host process 432 may comprise a common language runtime (CLR) 442 and CPLEX runtime libraries 482. The CLR 442 may provide a runtime execution environment. For example, the CLR 442 may correspond to a virtual machine such as a virtual machine component in a .NET framework that is responsible for managing the execution of .NET programs. The CLR 442 may compile intermediate language code into machine instructions that are executed by one or more processors in the television advertisement management system 100. Moreover, the CLR 442 may provide other services that include, but need not be limited to, memory management and/or exception handling.

The CPLEX runtime libraries 482 may correspond to libraries used by a CPLEX Optimizer, such as the IBM ILOG CPLEX described above, for example. The CPLEX runtime libraries 482 may be based on dynamic-link library (DLL) files, for example.

The CLR 442 may provide a runtime execution environment for an advertisement scheduler library 452, OPL models 462, and an OPL runtime library 472. The advertisement scheduler library 452 may correspond to one or more libraries used to implement the functions and/or operations that correspond to the advertisement scheduler solver 112. The advisement scheduler library 452 may be based on one or more DLL files (e.g. AdvertiseemtScheduler.dll). The OPL Models 460 may correspond to one or more optimization scripts used to implement the functions and/or operations that correspond to the advertisement scheduler 112. The OPL runtime library 472 may correspond to one or more libraries used to implement the optimization scripts corresponding to the OPL Models 462. The OPL runtime library 472 may be based on one or more DLL files (e.g., OPLAL-Las.dll).

The implementation described above enables the advertisement scheduler 112 to use advanced mathematical models and optimization applications and techniques to effectively and efficiently reshuffle the placement of the one or more spots based on one or more metrics such as the current indexing of deals, which represents the liability per pending spot, in order to minimize liability associated with the deals, and on a forecast of expected viewership associated with the deals, while honoring the advertiser's constraints and requirements. Nevertheless, the implementation of the advertisement scheduler 112 need not be so limited and other tools, applications, programming languages, and/or software architectures may be utilized to implement the functions and/or features of the advertisement scheduler 112 in the television advertisement management system 100.

Although the spot scheduler solver host process 430 and the advertisement scheduler host process 432 are shown as separate and distinct host processes, one or more of the components for each of the spot scheduler solver host process 430 and the advertisement scheduler host process 432 may be shared. For example, one or more of the components in the CLR 440, 442, and/or the CPLEX runtime libraries 480, 482 may be shared.

Figure 5:
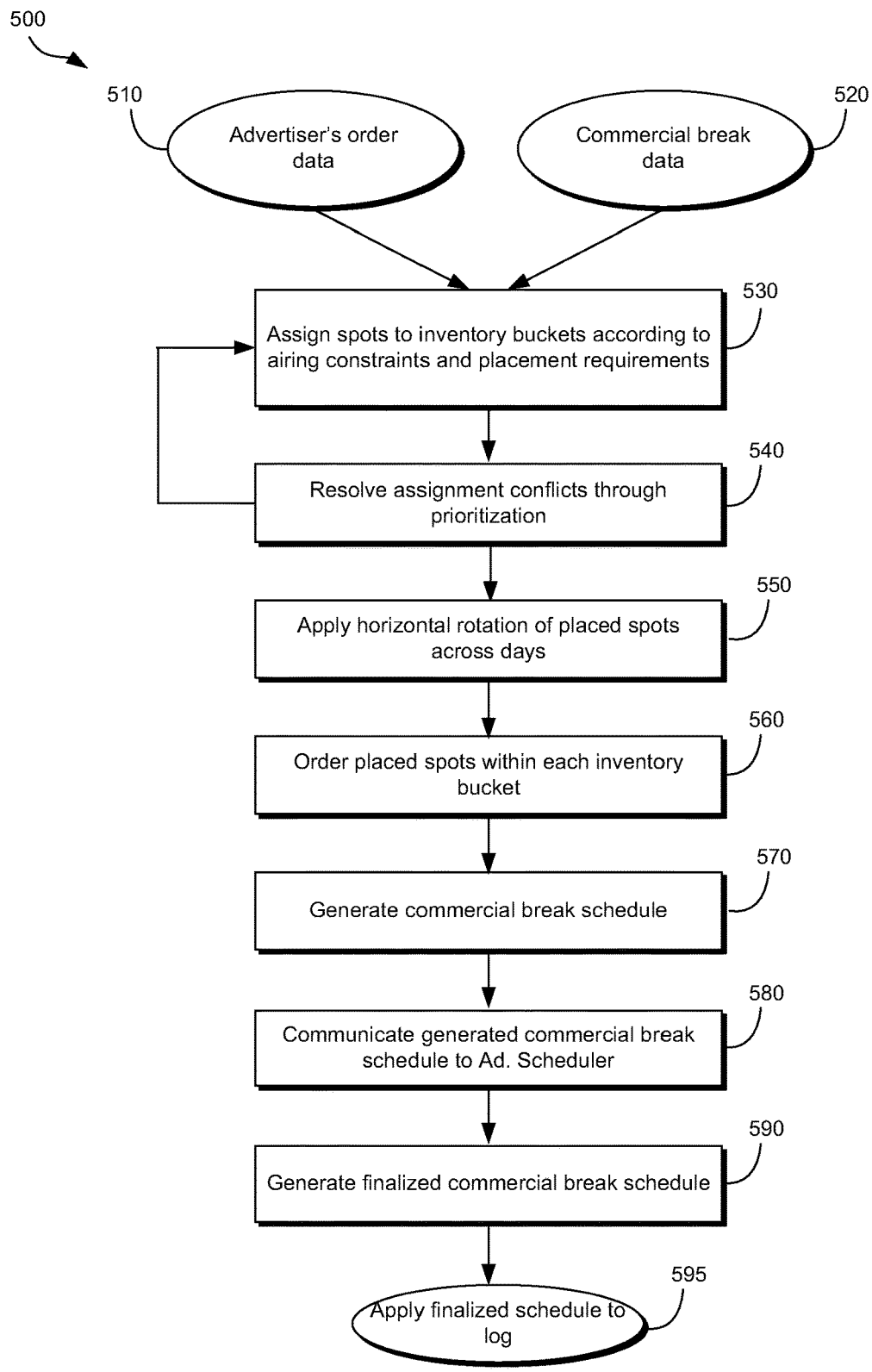
FIG. 5 is a flow diagram that illustrates exemplary steps for the placement of spots into commercial breaks, in accordance with an exemplary embodiment of the disclosure.

FIG. 5 is a flow diagram that illustrates exemplary steps for the placement of spots into commercial breaks, in accordance with an exemplary embodiment of the disclosure. Referring to FIG. 5, there is shown a flow chart 500 in which, at step 510, the spot scheduler solver 110 in the television advertisement management system 100 may receive an advertiser's order to place one or more spots into one or more commercial breaks, such as the commercial break 220, for example. The advertiser may be one of the advertiser order generation systems 130*a*, . . . , 130*n*, shown in FIG. 1A and the order may be received by one or more of the interface modules 400*a*, . . . , 400*n* in the television advertisement management system 100. The advertiser's order may comprise airing constraints and placement requirements corresponding to the one or more spots.

At step 520, the spot scheduler solver 110 may receive commercial break data or attributes, also referred to as inventory, for example. New orders, changes to orders, and/or changes to the commercial break attributes may trigger the spot scheduler solver 110 to run or execute. At step 530, the spot scheduler solver 110 may assign each of the one or more spots to an inventory bucket within the one or more commercial breaks based on the airing constraints and placement requirements. In this regard, one or more of the processors associated with the spot scheduler solver 110 in the television advertisement management system 100 may be utilized to perform the assignment. The constraints corresponding to each of the one or more spots may comprise one or more of network constraints, selling title constraints, inventory type constraints, allowable date and time constraints, and advertiser conflict constraints. The placement requirements corresponding to each of the one or more spots may comprise one or more of associative constraints, position constraints, time separation constraints, franchise and/or title exclusion constraints, and spot pinning constraints. The associative constraints may define the positioning of any two or more spots relative to each other within the same inventory bucket or in adjacent inventory buckets. The position constraints may define the positioning of any one spot in an inventory bucket and/or in a commercial break.

At step 540, when at least one of the one or more spots is not assigned because of conflicts, the spot scheduler solver 110 may perform a prioritization scheme to complete the assignment of the one or more spots. In this regard, one or more of the processors associated with the spot scheduler solver 110 in the television advertisement management system 100 may be utilized to perform the prioritization scheme. The prioritization scheme may be one of the lead time scheme or the rate scheme described above. The spot scheduler solver 110 may go through the prioritization scheme and the assignment process until all spots are processed, that is, until each of the spots is placed or is determined that it may not be placed.

At step 550, the spot scheduler solver 110 may perform horizontal rotation on the spots that have been placed. At step 560, the spot scheduler solver 110 may order of spots according their position requirement within each inventory bucket.

At step 570, the spot scheduler solver 110 may generate a commercial break schedule based on the completed assignment of the one or more spots. In this regard, one or more of the processors associated with the spot scheduler solver 110 in the television advertisement management system 100 may be utilized to generate the commercial break schedule.

At step 580, the generated commercial break schedule may be communicated to the advertisement scheduler 112 for further processing. In this regard, the advertisement scheduler 112 may be operable to reshuffle the generated commercial break schedule based on a forecast of expected viewership associated with one or more deals. At step 590, the advertisement scheduler 112 may be operable to generate a finalized commercial break schedule based on the reshuffling and forecasting. At step 595, the finalized commercial break schedule may be applied to a log by means of the television advertisement management system 100.

The steps described in FIG. 5 are presented by way of illustration and not of limitation. For example, some or all of the functions and/or processes of any one step may be combined with some or all of the functions and/or processes of another step. Such combination may result in more or fewer steps than those shown in FIG. 5. Other steps that may be performed by the spot scheduler solver 110 in connection with the flow chart 500 described in FIG. 5 may include maximizing the spread of days in which the one or more spots occur over the duration of the commercial break schedule. Moreover, the spot scheduler solver 110 may modify the generated commercial break schedule based on the completed assignment of the one or more spots and of one or more additional spots received in a subsequent order. These functions and/or processes may be performed by one or more of the processors associated with the spot scheduler solver 110 in the television advertisement management system 100.

In addition to the placement prioritization schemes listed above, the spot scheduler solver 100 may allow the use of custom processing instructions that the spot scheduler solver 100 is able to implement. The spots that are received for placement may have a corresponding processing instruction. A processing instruction may refer to a grouping of spots that get solved using one of the two prioritization schemes listed above. The processing instructions may be handled by one or more of the processors associated with the spot scheduler solver 110 in the television advertisement management system 100.

Figure 6:
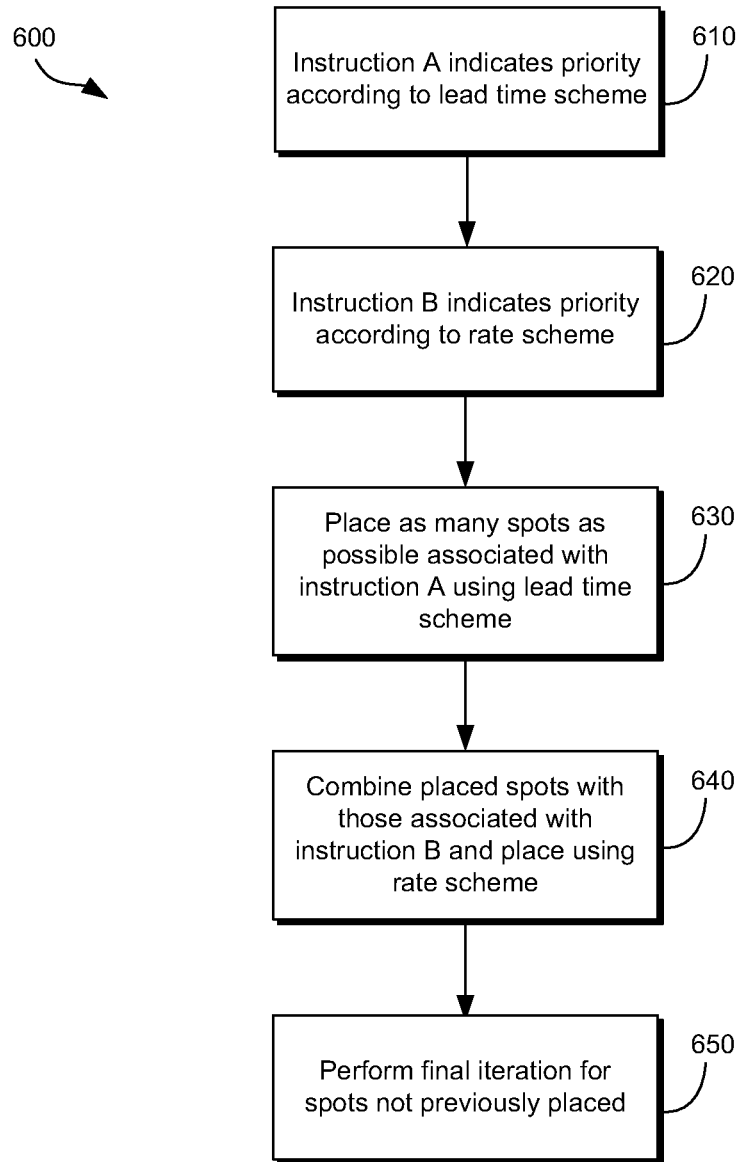
FIG. 6 is a flow diagram that illustrates exemplary steps in processing instructions associated with prioritization schemes used for the placement of spots into commercial breaks, in accordance with an exemplary embodiment of the disclosure.

FIG. 6 is a flow diagram that illustrates exemplary steps in processing instructions associated with prioritization schemes used for the placement of spots into commercial breaks, in accordance with an exemplary embodiment of the disclosure. Referring to FIG. 6, there is shown a flow chart 600 that describes an example of using processing instructions with the spot scheduler solver 100. For a particular set of spots to be solved, two processing instructions, instruction A and instruction B, may be provided. At step 610, instruction A indicates to place spots according to the lead time scheme described above. At step 620, instruction B indicates to place spots according to the rate scheme described above. In this example, 50% of the spots may correspond to instruction A and 50% may correspond to instruction B. At step 630, the spot scheduler solver 110 may place as many spots corresponding to instruction A as possible using the lead time prioritization scheme. At step 640, the resulting placed spots from step 630 may get combined by the spot scheduler solver 110 with the instruction B spots and solved again using the rate prioritization scheme associated with instruction B. In this regard, all of the spots are tossed up each time so that they may be placed anywhere in the inventory. At step 650, a final iteration may be performed by the spot scheduler solver 110 for any spots that were not associated with any processing instruction. The steps 610 through 650 may occur in one or more other sequences without departing from the spirit and scope of the various embodiments of the disclosure.

Figure 7:
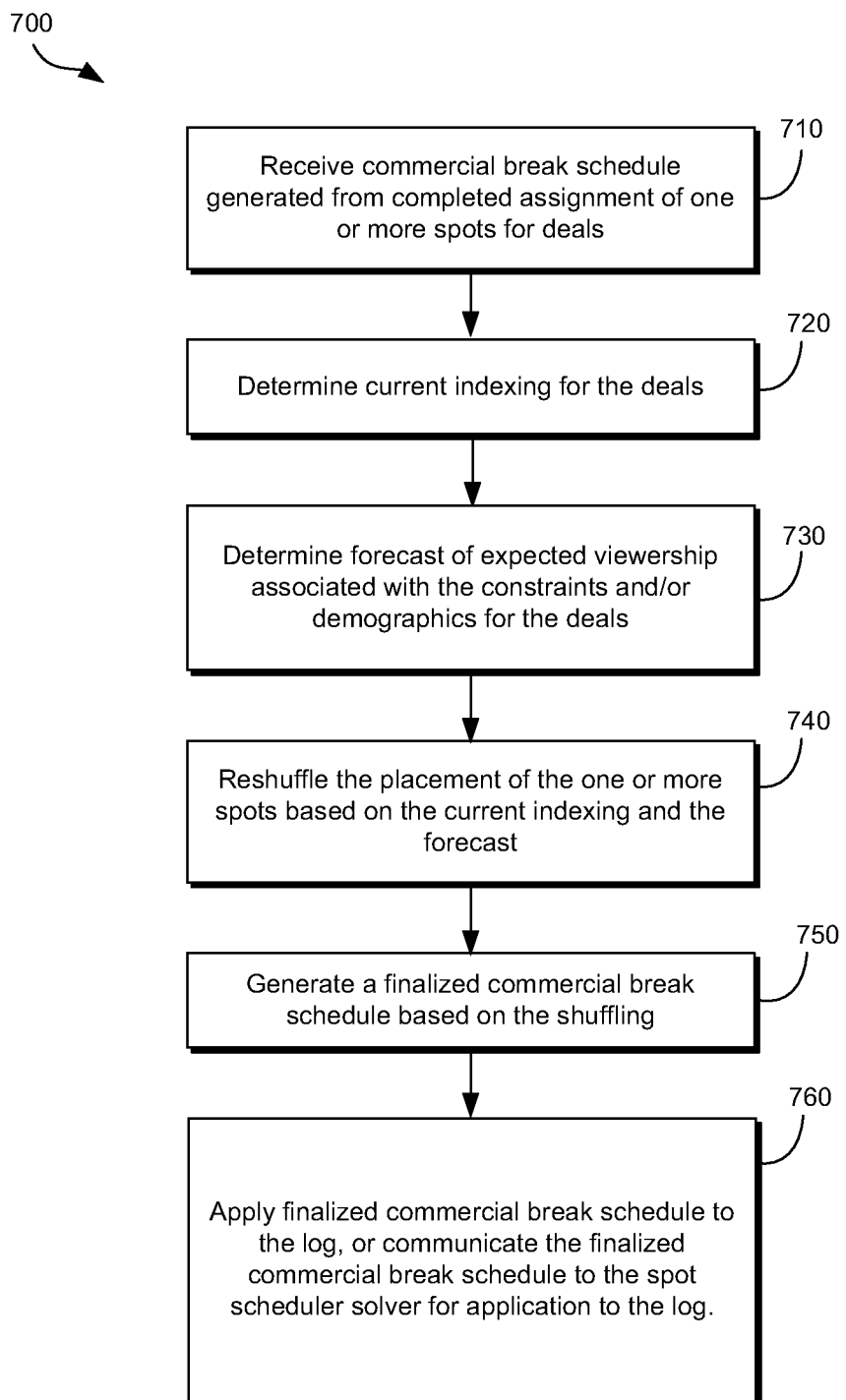
FIG. 7 is a flow diagram that illustrates exemplary steps in processing a commercial break schedule by an advertisement scheduler based on a current indexing, in accordance with an exemplary embodiment of the disclosure.

FIG. 7 is a flow diagram that illustrates exemplary steps in processing a commercial break schedule by an advertisement scheduler based on a current indexing, in accordance with an exemplary embodiment of the disclosure. Referring to FIG. 7, there is shown a flow chart 700 that describes example steps 710 though 780 for processing by the advertisement scheduler 112.

In step 710, the advertisement scheduler 112 may receive a commercial break schedule generated from a completed assignment of one or more spots for deals for processing. In step 720, the advertisement scheduler 112 may determine a current indexing for the deals. The current indexing may represent the projected liability per pending spot and is determined based on what has already been aired, and what will be aired in the future. In step 730, the advertisement scheduler 112 may determine a forecast of expected viewership associated with constraints and/or demographics for the deals is determined. In step 740, the advertisement scheduler 112 may reshuffle the placement of the one or more spots based on the indexing and the forecast. In step 750, the advertisement scheduler 112 may generate a finalized schedule based on the shuffling. In step 760, the advertisement scheduler 112 may apply the finalized commercial break schedule to the log or communicate the finalized commercial break schedule to the spot scheduler solver 110 for application to the log.

Figure 8:
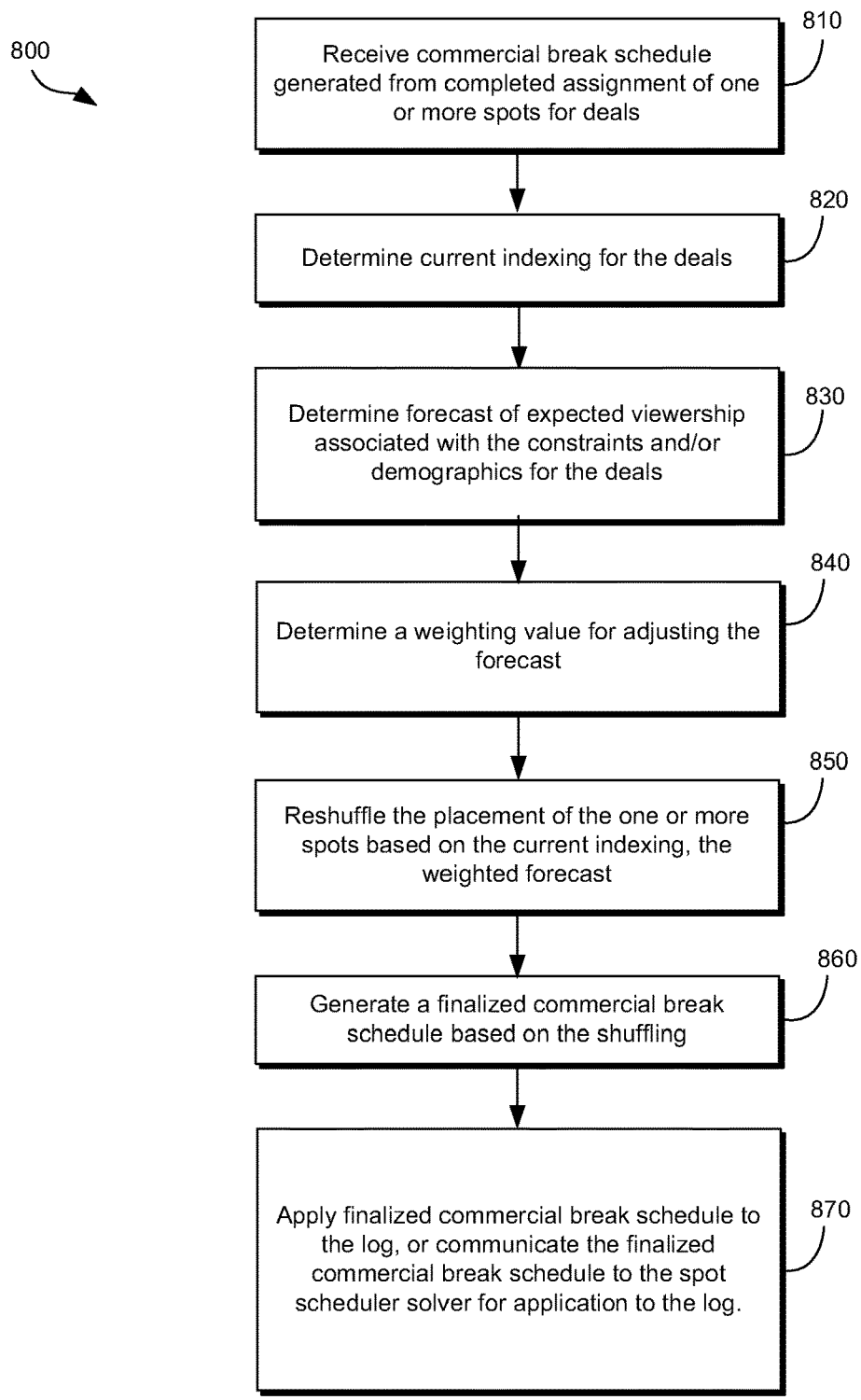
FIG. 8 is a flow diagram that illustrates exemplary steps in processing a commercial break schedule by an advertisement scheduler based on a current indexing and weighted forecast, in accordance with an exemplary embodiment of the disclosure.

FIG. 8 is a flow diagram that illustrates exemplary steps in processing a commercial break schedule by an advertisement scheduler based on a current indexing and weighted forecast, in accordance with an exemplary embodiment of the disclosure. Referring to FIG. 8, there is shown a flow chart 800 that describes example steps 810 though 870 for processing by the advertisement scheduler 112.

In step 810, the advertisement scheduler 112 may receive a commercial break schedule generated from a completed assignment of one or more spots for deals for processing. In step 820, the advertisement scheduler 112 may determine a current indexing for the deals. The current indexing represents the projected liability per pending spot and is determined based on what has already been aired, and what will be aired in the future. In step 830, the advertisement scheduler 112 may determine a forecast of expected viewership associated with constraints and/or demographics for the deals is determined. In step 840, the advertisement scheduler 112 may determine a weighting value for adjusting the forecast. In step 850, the advertisement scheduler 112 may reshuffle the placement of the one or more spots based on the indexing and the weighted forecast. In step 860, the advertisement scheduler 112 may generate a finalized schedule based on the shuffling. In step 870, the advertisement scheduler 112 may apply the finalized commercial break schedule to the log or communicate the finalized commercial break schedule to the spot scheduler solver 110 for application to the log.

Figure 9:
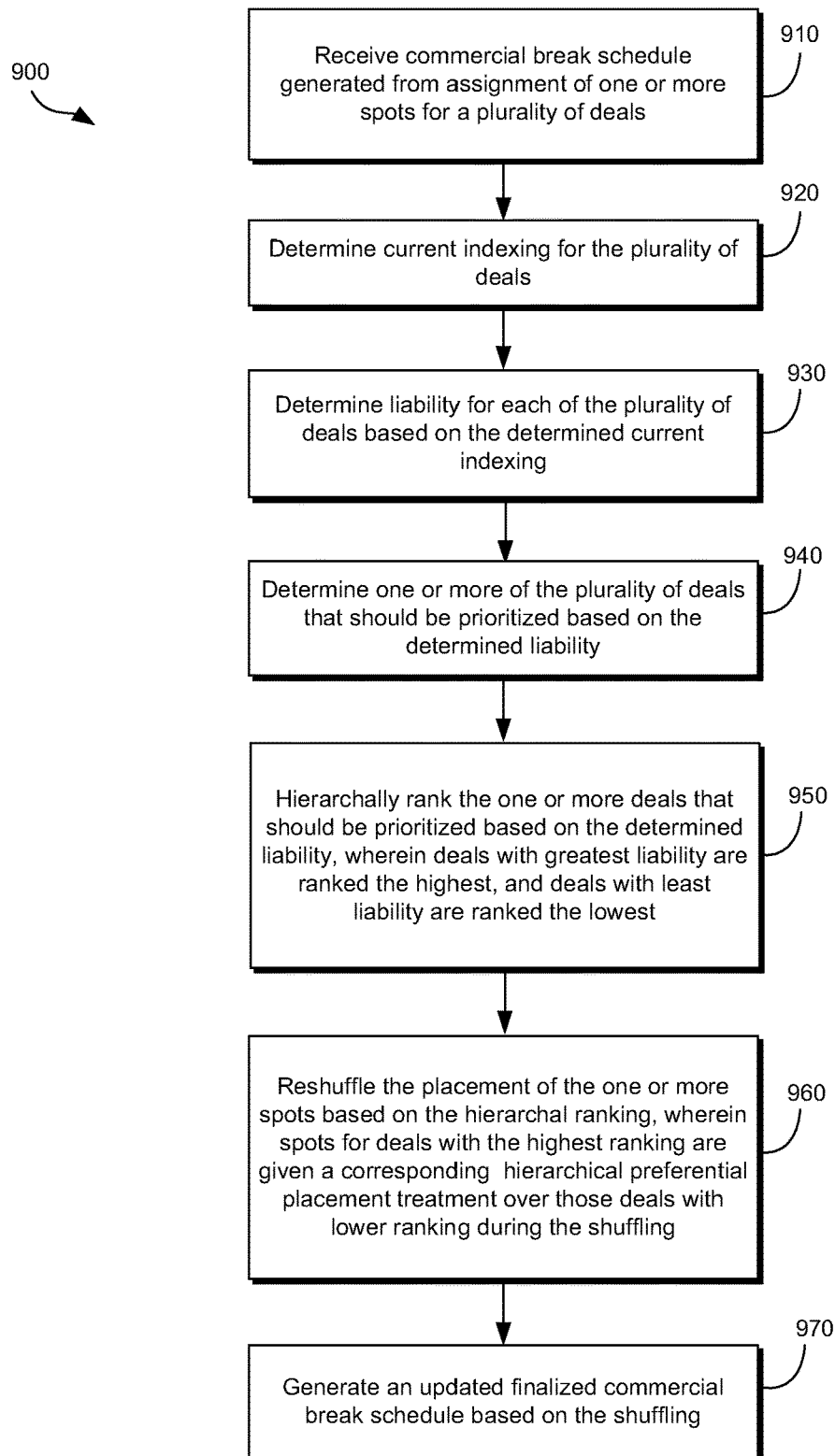
FIG. 9 is a flow diagram that illustrates exemplary steps in processing a commercial break schedule by an advertisement scheduler based on a current indexing and liability, in accordance with an exemplary embodiment of the disclosure.

FIG. 9 is a flow diagram that illustrates exemplary steps in processing a commercial break schedule by an advertisement scheduler based on a current indexing and liability, in accordance with an exemplary embodiment of the disclosure. Referring to FIG. 9, there is shown a flow chart 900 that describes example steps 910 though 970 for processing by the advertisement scheduler 112.

In step 910, the advertisement scheduler 112 may receive a commercial break schedule generated from assignment of one or more spots for a plurality of deals. In step 920, the advertisement scheduler 112 may determine current indexing for the plurality of deals. The current indexing may represent the projected liability per pending spot and is determined based on what has already been aired, and what will be aired in the future. In step 930, the advertisement scheduler 112 may determine liability for each of the plurality of deals based on the determined current indexing. In step 940, the advertisement scheduler 112 may determine one or more of the plurality of deals that should be prioritized based on the determined liability. In step 950, the advertisement scheduler 112 may hierarchally rank the one or more deals that should be prioritized based on the determined liability, wherein deals with greatest liability are ranked the highest, and deals with least liability are ranked the lowest. In step 960, the advertisement scheduler 112 may reshuffle the placement of the one or more spots based on the hierarchal ranking, wherein spots for deals with the highest ranking are given a corresponding hierarchical preferential placement treatment over those deals with lower ranking during the shuffling. In step 970, the advertisement scheduler 112 may generate an updated finalized commercial break schedule based on the shuffling.

For illustrative purposes, and by way of example, an operator of the television advertisement management system 100 may enter into deals with a plurality of advertisers utilizing the advertiser order generation systems 130a, . . . , 130n. Some deals may obligate the operator to provide certain viewership when delivering advertisements for the advertisers, while other deals such as direct response (DR) deals may not obligate the operator to provide a certain viewership. In a first deal 1 (D1), the operator of the television advertisement management system 100 contracts to deliver viewership of 1 M (million) for widget 1 (W1) advertisement, satisfying inventory constraints C1, such as primetime, and for demographics P18-49 (People/years of age) (Demo1), over 4 quarters. At end of the 4th quarter, D1 is indexing at 900,000 or 90%, then there an under-delivery of the contracted viewership, which is termed liability. In order to maximize delivery over time for the operator's obligation for D1, the television advertisement management system 100 has to pick inventory, air time, to provide the additional 100,000 viewership and satisfy the inventory constraints C1, and demographics, Demo1.

In a second deal 2 (D2), the operator of the television advertisement management system 100 contracts to deliver viewership of 2 million for widget 2 (W1) advertisement, satisfying inventory constraints C2, such as primetime, and for demographics M35+ (Males/years of age) (Demo2), over 2 quarters. At end of the $2^{nd}$ quarter, D2 is indexing at 1 M or 50%. D2 thus has under-delivery and a greater liability than D1. In order to maximize delivery over time for their obligation for D2, the television advertisement management system 100 has to pick inventory, air time, to provide the additional M viewership and satisfy the inventory constraints C2, and demographics, Demo2.

In a third deal 3 (D3), the operator of the television advertisement management system 100 contracts to deliver viewership of 1 million for widget 2 (W1) advertisement, satisfying inventory constraints C3, such as primetime, and for demographics F35+ (Female/years of age) (Demo3), over 4 quarters. At end of the 4th quarter, D3 is indexing at 400,000 or 40%. D3 thus has under-delivery and a greater liability than D2, and D3. In order to maximize delivery over time for their obligation for D3, television advertisement management system 100 has to pick inventory, air time, to provide the additional 600,000 viewership and satisfy the inventory constraints D3, and demographics, Demo3.

In accordance with an exemplary embodiment of the disclosure, television advertisement management system 100 may be operable to provide preferential treatment to those deals that are determined to have the highest liability. For example, D3, which indexing at 40% has the highest liability and would be given the greatest preferential treatment when reshuffling the placement of the one or more spots based on the current indexing of the one or more deals, where the current indexing represents the projected liability of a pending spot and is determined based on what has already been aired, and what will be aired in the future. D2, which indexing at 50% is performing better than D3, would be given preferential treatment that would be less than the preferential treatment given to D3 when performing the reshuffling when reshuffling the placement of the one or more spots based on the current indexing of the one or more deals. D1, which indexing at 90% and has the lowest liability, is performing much better than D2 and D3. Accordingly, D1 would be given the lowest preferential treatment when reshuffling the placement of the one or more spots based on the current indexing of the one or more deals.

The television advertisement management system 100 may provide a hierarchical ranking of the preferential treatment of the deals that would result in D3 receiving highest rank and preference, followed by D2, followed by D1, with D1 receiving lowest rank and preference, and thus the least preferential treatment when reshuffling the placement of the one or more spots based on the current indexing and liability of the one or more deals.

In accordance with various embodiments of the disclosure, one or more parameters may be utilized to enable or disable a selling title in order to identify whether a particular network is an advertisement scheduler network. A candidate percentage parameter, for example, may be utilized to determine across a selling title week, how many of the total spots should be considered a "candidates" for the scheduling by the advertisement scheduler 112. An excluded selling title parameter may be utilized to identify one or more selling titles for which the advertisement scheduler 112 should not be run. In other words, for selling titles identified by the excluded selling title parameter, the normal spot scheduler solution is applied. In some embodiments of the disclosure, a selling title that does not have, for example, 3 or more franchise airings in a week may be excluded from advertisement scheduler 112 regardless of whether it is identified by the excluded selling title parameter.

Figure 10:
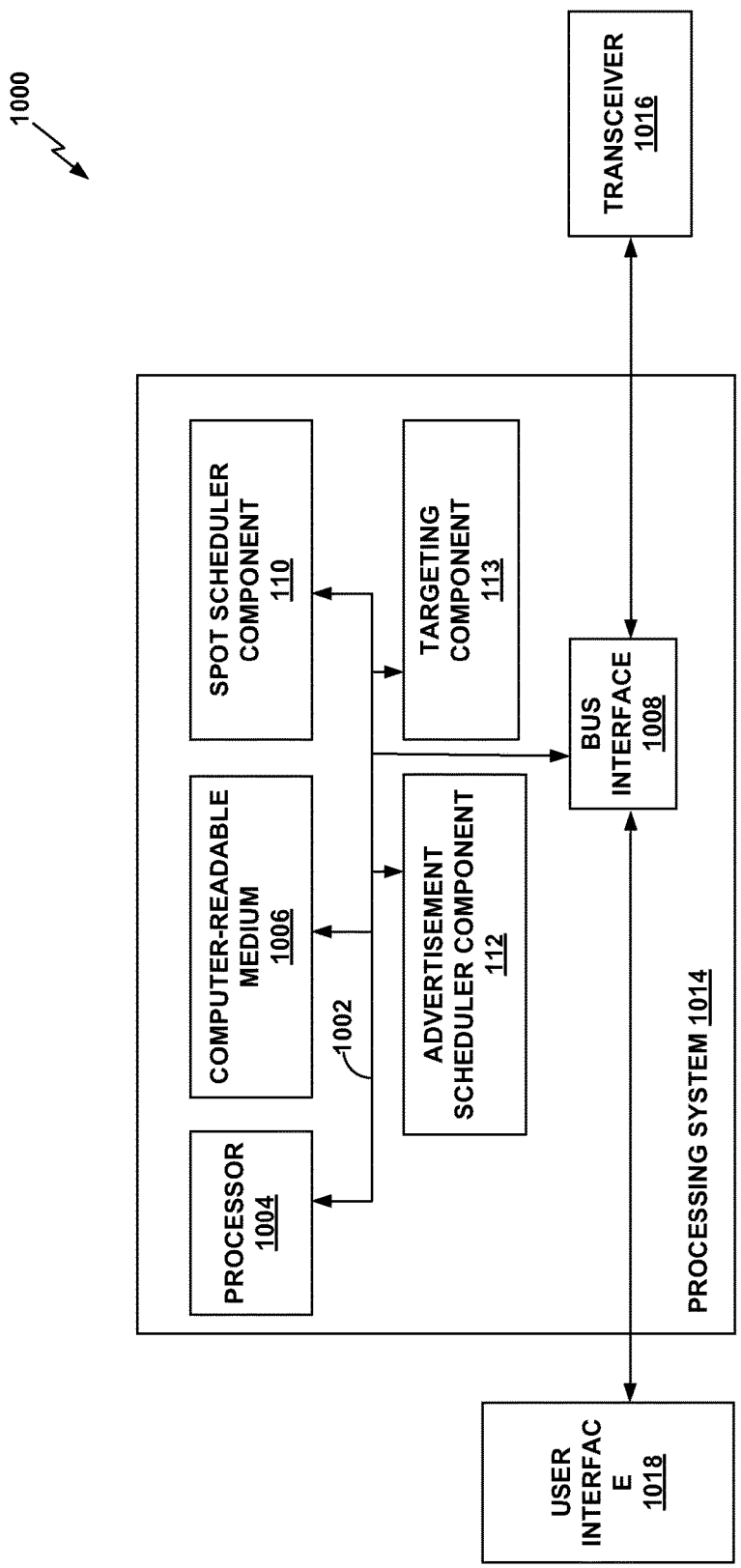
FIG. 10 is a conceptual diagram illustrating an example of a hardware implementation for a television advertisement management system employing a processing system for targeting and demographics scheduling utilizing competitive audience estimation, in accordance with an exemplary embodiment of the disclosure.

FIG. 10 is a conceptual diagram illustrating an example of a hardware implementation for a television advertisement management system employing a processing system for targeting and demographics scheduling utilizing competitive audience estimation, in accordance with an exemplary embodiment of the disclosure. Referring to FIG. 10, the hardware implementation for the television advertisement management system 100 of FIG. 1A employs a processing system 1014 for targeting and demographics scheduling utilizing competitive audience estimation, as described herein. In some examples, the processing system 1014 may comprise one or more hardware processors 1004, a spot scheduler solver component 110, an advertisement scheduler component 112, and a targeting component 113.

In this example, the television advertisement management system employing a processing system 1014 may be implemented with a bus architecture, represented generally by the bus 1002. The bus 1002 may include any number of interconnecting buses and bridges depending on the specific implementation of the television advertisement management system 100 (FIG. 1A) and the overall design constraints. The bus 1002 links together various circuits including the one or more processors, represented generally by the processor 1004, the computer-readable media, represented generally by the computer-readable medium 1006, spot scheduler component 110, targeting component 113, frequency selecting component 114, (which correspond to the spot scheduler 110, advertisement scheduler 112, and targeting processor 113, respectively, illustrated in FIG. 1A), which may be configured to carry out one or more methods or procedures described herein.

The bus interface 1008 provides an interface between the bus 1002 and a transceiver 1016. The transceiver 1016 provides a means for communicating via the network 120 with various other apparatus such as the advertiser order generation systems 130a, . . . , 130n and the consumer devices 132a, . . . , 132n. (FIG. 1A).

The user interface 1018 (e.g., keypad, display, speaker, microphone, pointing) may also be provided to enable a user to interact with the television advertisement management system 100 (FIG. 1A). In accordance with an aspect of the disclosure, the user interface 1018 may enable user interaction with the television advertisement management system 100. For example, the user interface 1018 may be utilized to enter administration parameters, configure, manage, and/or handle maintenance of one or more components within the television advertisement management system 100.

The processor 1004 may be operable to manage the bus 1002 and general processing, including the execution of software stored on the computer-readable medium 1006. In accordance with an embodiment of the disclosure, the processor 1004 may be operable to control the operation of the television advertisement management system 100 and may be operable to coordinate operation amongst the components therein, as well as with entities external to the television advertisement management system 100.

The software, when executed by the processor 1004, causes the television advertisement management system 100 (FIG. 1A) to perform the various functions described infra for any particular apparatus. The computer-readable medium 706 may also be used for storing data that is manipulated by the processor 704 when executing software.

In an aspect of the disclosure, processor 1004, computer-readable medium 1006, or a combination of both may be configured or otherwise specially programmed to perform the functionality of the spot scheduler component 110, the advertisement scheduler component 112, and the components thereof, etc. (corresponding to the spot scheduler 110, advertisement scheduler 112, respectively, see FIG. 1A), or various other components described herein. For example, processor 1004, computer-readable medium 1006, or a combination of both may be configured or otherwise specially programmed to perform the functionality of the spot scheduler component 110, the advertisement scheduler component 112, and the components thereof, etc. described herein (e.g., the method 160 in FIG. 1C, method 500 in FIG. 5, the method 600 in FIG. 6, the method 600 in FIG. 6, the method 700 in FIG. 7, the method 800 in FIG. 8, the method 900 in FIG. 9, etc.), and/or the like.

In accordance with various embodiments of the disclosure, an advertisement management system 100, which comprises a spot scheduler solver 110 and an advertisement scheduler 112, is operable to communicate with a plurality of advertiser order generation systems 130*a*, . . . , 130*n*, and electronically receives, via a communication network 120, deals comprising advertiser orders. The advertisement scheduler 112 receives a commercial break schedule generated from a completed assignment of one or more spots, wherein the one or more spots correspond to the deals comprising the advertiser orders to place the one or more spots into one or more commercial breaks in the commercial break schedule based on constraints and placement requirements. The advertisement scheduler 112 may determine a current indexing for one or more of the deals and reshuffles the placement of the one or more spots based on the current indexing of the one or more deals in order to minimize liability associated with the one or more deals. The reshuffling is based on a forecast of expected viewership associated with the one or more deals. The reshuffling of the placement of the one or more spots is done across one or more channels that airs the one or more spots. The advertisement scheduler 112 may generate a finalized commercial break schedule based on the reshuffling. The expected viewership may be forecasted for a particular period based in the status of prior logs. As an example, and without limitation, the expected viewership may be forecasted based on the status of the prior logs for an upcoming 7-day period.

The advertisement scheduler 112 may update a current forecast of expected viewership at the end of the particular period based on actual ratings for a prior week, which may be derived at least in part from Nielsen ratings. The advertisement scheduler 112 may maximize delivery for candidates deals that are under-delivering or are not pacing as expected, where pacing is a computation of cumulative demographics guaranteed so far, that is, at a particular point in time. The advertisement scheduler 112 may reshuffle the placement of the one or more spots such that the candidate deals get maximum delivery in order to minimize the liability. For example, the advertisement scheduler 112 may determine or identify candidate deals with liability above a certain value such as a threshold value, which indicates that the deals are not pacing as expected and may reshuffle the placement of the one or more spots such that the candidate deals achieve maximum delivery, thereby minimizing liability. The candidate deals may be determined or identified based on their current delivery value. The advertisement scheduler 112 may determine each demographic for each of the one or more deals and generate, for each demographic, an estimate of the expected viewership associated with the one or more deals.

The advertisement scheduler 112 may generate the estimate of the expected viewership for specified time intervals. The time intervals may be, for example, 30-minute time intervals. The advertisement scheduler 112 may determine a current indexing for each of a plurality of the deals and provide preferential treatment to placement of the one or more spots for one or more of the plurality of deals having greatest liability based on the determined current indexing when performing the reshuffling. The advertisement scheduler 112 may modify the forecast of expected viewership associated with the one or more deals based on a weighting factor, which may be updatable. The advertisement scheduler 112 may update the weighting factor over time to improve the current indexing of the one or more deals over time.

The reshuffling of the placement of the one or more spots based on the liability per pending spot of the one or more deals in order to minimize liability associated with the one or more deals, wherein the reshuffling is based on a forecast of expected viewership associated with the one or more deals and the generating a finalized commercial break schedule based on the reshuffling enables the television advertisement management system 100 to operate more efficiently since the memory may be more efficiently utilized when performing these operations resulting in faster computation time without sacrificing accuracy. A finalized commercial break schedule may more quickly be determined to create more focused advertising campaigns that allows the television management system to minimize the liability for the deals and make the spot schedule solver and advertisement schedule operate more efficiently.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for the advertisement scheduler 112.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present invention has been described with reference to certain embodiments, it will be noted understood by, for example, those skilled in the art that various changes and modification could be made and equivalents may be substituted without departing from the scope of the present invention as defined, for example, in the appended claims. In addition, many modifications may be made to adapt a particular situation or material to the teachings of the present invention without departing from its scope. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Therefore, it is intended that the present invention not be limited to the particular embodiment disclosed, but that the present invention will include all embodiments falling within the scope of the appended claims.

What is claimed is:

1. A method, comprising: in an advertisement management system that communicates with a plurality of advertiser order generation systems and electronically receives, via a communication network, a plurality of deals comprising advertiser orders: receiving a commercial break schedule generated from a completed assignment of one or more spots, wherein the one or more spots correspond to the plurality of deals comprising the advertiser orders to place the one or more spots into one or more commercial breaks in the commercial break schedule based on constraints and placement requirements; determining a first liability per pending spot for one or more of the plurality of deals; determining candidate deals with liability above a threshold value, indicating that the candidate deals are under-performing; reshuffling the placement of the one or more spots for maximum delivery of the candidate deals in order to minimize the liability associated with the candidate deals, wherein the reshuffling is based on a forecast of an expected viewership associated with the one or more of the plurality of deals, and a pacing computation of cumulative demographics guaranteed at a particular point in time; modifying the forecast of the expected viewership associated with the one or more of the plurality of deals based on a weighting factor, wherein the weighting factor is updatable; and generating a finalized commercial break schedule based on the reshuffling to create a focused advertisement campaign.

2. The method according to claim 1, wherein the reshuffling of the placement of the one or more spots is done across one or more channels that airs the one or more spots.

3. The method according to claim 1, wherein the expected viewership is forecasted for a particular period based on a status of one or more prior logs.

4. The method according to claim 3, further comprising updating a current forecast of the expected viewership at the end of the particular period based on actual ratings for a prior week.

5. The method according to claim 4, wherein the actual ratings are derived at last in part from Nielsen ratings.

6. The method according to claim 1, further comprising: determining demographic for each of the one or more of the plurality of deals; and generating, for the demographic, an estimate of the expected viewership associated with the one or more of the plurality of deals.

7. The method according to claim 1, further comprising generating an estimate of the expected viewership for specified time intervals.

8. The method according to claim 7, wherein the specified time intervals comprise 30-minute time intervals.

9. The method according to claim 8, further comprising: determining a second liability per pending spot for each of the plurality of deals; and providing preferential treatment to the placement of the one or more spots for the one or more of the plurality of deals having a greatest liability,
wherein the preferential treatment is provided based on the second liability per pending spot for the reshuffling.

10. The method according to claim 1, further comprising updating the weighting factor over time to improve the first liability per pending spot of the one or more of the plurality of deals over the time.

11. An advertisement management system, comprising: one or more hardware processors configured to: communicate with a plurality of advertiser order generation systems and electronically receive, via a communication network, a plurality of deals comprising advertiser orders; receive a commercial break schedule generated from a completed assignment of one or more spots, wherein the one or more spots correspond to the plurality of deals comprising the advertiser orders to place the one or more spots into one or more commercial breaks in the commercial break schedule based on constraints and placement requirements; determine a first liability per pending spot for one or more of the plurality of deals; determine candidate deals with liability above a threshold value, indicating that the candidate deals under-perform; reshuffle the placement of the one or more spots for maximum delivery of the candidate deals in order to minimize the liability associated with the candidate deals, wherein the reshuffle is based on a forecast of an expected viewership associated with the one or more of the plurality of deals, and a pacing computation of cumulative demographics guaranteed at a particular point in time; modify the forecast of the expected viewership associated with the one or more of the plurality of deals based on a weighting factor, wherein the weighting factor is updatable; and generate a finalized commercial break schedule based on the reshuffle to create a focused advertisement campaign.

12. The advertisement management system according to claim 11, wherein the reshuffle of the placement of the one or more spots is done across one or more channels that airs the one or more spots.

13. The advertisement management system according to claim 11, wherein the expected viewership is forecasted for a particular period based on a status of one or more prior logs.

14. The advertisement management system according to claim 13, wherein the one or more hardware processors are further configured to update a current forecast of the expected viewership at the end of the particular period based on actual ratings for a prior week.

15. The advertisement management system according to claim 14, wherein the actual ratings are derived at last in part from Nielsen ratings.

16. The advertisement management system according to claim 11, wherein the one or more hardware processors are further configured to: determine demographic for each of the one or more of the plurality of deals; and generate, for the demographic, an estimate of the expected viewership associated with the one or more of the plurality of deals.

17. The advertisement management system according to claim 11, wherein the one or more hardware processors are further configured to generate an estimate of the expected viewership for specified time intervals.

18. The advertisement management system according to claim 17, wherein the specified time intervals comprise 30-minute time intervals.

19. The advertisement management system according to claim 18, wherein the one or more hardware processors are further configured to: determine a second liability per pending spot for each of the plurality of deals; and provide preferential treatment to the placement of the one or more spots for the one or more of the plurality of deals that corresponds to a greatest liability,
wherein the preferential treatment is provided based on the second liability per pending spot for the reshuffle.

20. The advertisement management system according to claim 11, wherein the one or more hardware processors are further configured to update the weighting factor over time to improve the first liability per pending spot of the one or more of the plurality of deals over the time.

21. A non-transitory computer-readable medium having stored thereon, a computer program having at least one code section for processing data, the at least one code section being executable by a computer to cause the computer to execute operations, the operations comprising: receiving a commercial break schedule generated from a completed assignment of one or more spots, wherein the one or more spots correspond to a plurality of deals comprising advertiser orders to place the one or more spots into one or more commercial breaks in the commercial break schedule based on constraints and placement requirements; determining a first liability per pending spot for one or more of the plurality of deals; determining candidate deals with liability above a threshold value, indicating that the candidate deals are under-performing; reshuffling the placement of the one or more spots for maximum delivery of the candidate deals in order to minimize the liability associated with the candidate deals, wherein the reshuffling is based on a forecast of an expected viewership associated with the one or more of the plurality of deals, and a pacing computation of cumulative demographics guaranteed at a particular point in time; modifying the forecast of the expected viewership associated with the one or more of the plurality of deals based on a weighting factor, wherein the weighting factor is updatable; and generating a finalized commercial break schedule based on the reshuffling to create a focused advertisement campaign.

22. The non-transitory computer-readable medium according to claim 21, wherein the reshuffling of the placement of the one or more spots is done across one or more channels that airs the one or more spots.

23. The non-transitory computer-readable medium according to claim 21, wherein the expected viewership is forecasted for a particular period based on a status of one or more prior logs.

24. The non-transitory computer-readable medium according to claim 23, wherein the operations further comprise updating a current forecast of the expected viewership at the end of the particular period based on actual ratings for a prior week.

25. The non-transitory computer-readable medium according to claim 24, wherein the actual ratings are derived at last in part from Nielsen ratings.

26. The non-transitory computer-readable medium according to claim 21, wherein the operations further comprise: determining demographic for each of the one or more of the plurality of deals; and generating, for the demographic, an estimate of the expected viewership associated with the one or more of the plurality of deals.

27. The non-transitory computer-readable medium according to claim 21, wherein the operations further comprise generating an estimate of the expected viewership for specified time intervals.

28. The non-transitory computer-readable medium according to claim 27, wherein the specified time intervals comprise 30-minute time intervals.

29. The non-transitory computer-readable medium according to claim 28, wherein the operations further comprise: determining a second liability per pending spot for each of the plurality of deals; and providing preferential treatment to the placement of the one or more spots for the one or more of the plurality of deals having a greatest liability, wherein the preferential treatment is provided based on the second liability per pending spot for the reshuffling.

30. The non-transitory computer-readable medium according to claim 21, wherein the operations further comprise updating the weighting factor over time to improve the first liability per pending spot of the one or more of the plurality of deals over the time.

* * * * *